United States Patent
Nogueira-Nine

(10) Patent No.: US 8,692,708 B2
(45) Date of Patent: Apr. 8, 2014

(54) RADIOMETRIC IMAGING DEVICE AND CORRESPONDING METHOD

(75) Inventor: Juan Nogueira-Nine, Stuttgart (DE)

(73) Assignee: Sony Corporation, Tokyo (JP)

( * ) Notice: Subject to any disclaimer, the term of this patent is extended or adjusted under 35 U.S.C. 154(b) by 492 days.

(21) Appl. No.: 13/053,808

(22) Filed: Mar. 22, 2011

(65) Prior Publication Data

US 2011/0273320 A1    Nov. 10, 2011

(30) Foreign Application Priority Data

Mar. 30, 2010  (EP) .................................... 10158502
Jul. 16, 2010  (EP) .................................... 10169815

(51) Int. Cl.
  *G01S 13/00*  (2006.01)
  *G02B 26/10*  (2006.01)

(52) U.S. Cl.
  USPC .......................... 342/179; 342/192; 250/334

(58) Field of Classification Search
  USPC ............ 342/27, 179, 185, 191, 192; 356/317, 356/451, 479; 250/332, 334
  See application file for complete search history.

(56) References Cited

U.S. PATENT DOCUMENTS

| 7,224,314 | B2 | 5/2007 | Lee et al. |
| 7,616,306 | B2 | 11/2009 | Brady et al. |
| 7,724,189 | B2 | 5/2010 | Lee |
| 2007/0139248 | A1 | 6/2007 | Baharav et al. |
| 2007/0221847 | A1 | 9/2007 | Lettington et al. |
| 2009/0161933 | A1 | 6/2009 | Chen |
| 2009/0185636 | A1 | 7/2009 | Palotai et al. |
| 2010/0182434 | A1 | 7/2010 | Koch et al. |

FOREIGN PATENT DOCUMENTS

| EP | 2 204 671 A1 | 7/2010 |
| WO | WO 2007/095312 A2 | 8/2007 |

OTHER PUBLICATIONS

U.S. Appl. No. 12/939,514, filed Nov. 4, 2010, Nogueira-Nine.
U.S. Appl. No. 13/032,120, filed Feb. 22, 2011, Sarkis.
Bennamoun et al., Object Recognition: Fundamentals and Case Studies, ISBN 1-85233-398-7, 2002; Table of Contents, 3 pages; Section 1.1-1.10, pp. 3-27; Section 6.1-6.2.8, pp. 221-259; References and Index, pp. 329-350.
Extended European Search Report issued Jul. 14, 2011, in European Patent Application No. 11159432-1.
Levanda et al., "Synthetic Aperture Radio Telescopes," IEEE Signal Processing Magazine, vol. 27, No. 1, Jan. 2010, pp. 14-29.
Anderton et al., "Security Scanning at 94GHz," Proceedings of SPIE, vol. 6211, 2006, pp. 62110C-1-62110C-6.

(Continued)

*Primary Examiner* — Dao Phan
(74) *Attorney, Agent, or Firm* — Oblon, Spivak, McClelland, Maier & Neustadt, L.L.P.

(57) ABSTRACT

Radiometric imaging for scanning a scene includes a radiometer for detecting radiation emitted in a predetermined spectral range from a spot of the scene and for generating a radiation signal from the detected radiation. Spot movement circuitry effects a movement of the spot, from which the radiation is detected, to various positions. Control circuitry controls the spot movement circuit to effect the movement of the spot from one position to another position so that radiation is detected at a number of spots distributed over the scene. The number is lower than the number of pattern signals of the high-density signal pattern and the radiation signals generated from the radiation detected at the number of spots form a low-density signal pattern. Processing circuitry processes the radiation signals of the low-density signal pattern and generates the high-density signal pattern by applying compressive sensing to the low-density signal pattern.

28 Claims, 14 Drawing Sheets

(56) References Cited

OTHER PUBLICATIONS

Griffin et al., "Compressive Sensing Applied to Homeland Security," IEEE Sensors Applications Symposium, Feb. 12-14, 2008, XP007918912, 4 pages.
Shen et al., "Terahertz pulsed spectroscopic imaging using optimized binary masks," Applied Physics Letters, vol. 95, No. 23, 231112, Dec. 2009, 3 pages.
Tello et al., "A Novel Strategy for Radar Imaging Based on Compressive Sensing," IEEE International Geoscience and Remote Sensing Symposium (IGARSS), Jul. 2008, pp. 213-216.
Kyung Hwan Jin et al., "Compressed Sensing Pulse-Echo Mode THz Tomography," $34^{th}$ International Conference on Infrared, Millimeter, and Terahertz Waves, IRMMW-THZ 2009, Sep. 2009, 1 page.
Heidari et al., "A 2D Camera Design with a Single-pixel Detector," $34^{th}$ International Conference on Infrared, Millimeter, and Terahertz Waves, IRMMW-THZ 2009, Sep. 2009, 1 page.
Lynch et al., "Performance Limitations of Compressive Sensing for Millimeter Wave Imaging," Passive Millimeter-Wave Imaging Technology XIII, Proceedings of SPIE, vol. 7670, Apr. 2010, pp. 76700D-1-76700D-8.
Assessment of Millimeter-Wave and Terahertz Technology for Detection and Identification of Concealed Explosives and Weapons . Washington, DC: The National Academies Press, 2007.
Emamnuel J. Candès, "Compressive sampling", Proceedings of the International Congress of Mathematicians, 2006, http://www.princeton.edu/~yxi/paper/CompressiveSampling.pdf, 20 pages.
Ali Cafer Gurbuz, et al., "A Compressive Sensing Data Acquisition and Imaging Method for Stepped Frequency GPRs", IEEE Transactions on Signal Processing, vol. 57, No. 7, Jul. 2009, http://users.ece.gatech.edu/wrscott/Papers/TGARRS_2009_CS.pdf, pp. 2640-2650.
Emmanuel J. Candès, et al., "An Introduction to Compressive Sampling", IEEE Signal Processing Magazine, Mar. 2008, pp. 21-30.
Richard G. Baraniuk, "Compressive Sensing", IEEE Signal Processing Magazine, Jul. 2007, 4 pages.
David L. Donoho, "Compressed Sensing", IEEE Transactions on Information Theory, vol. 52, No. 4, Apr. 2006, pp. 1289-1306.
N. A. Salmon, et al., "Digital Beam-Forming for Passive Millimetre Wave Security Imaging", PIE Europe, Security & Defense, Passive Millimetre-Wave and Terahertz Imaging and Technology II, 2007, 11 pages.
R. Fletcher, et al., "Function minimization by conjugate gradients", The computer Journal, vol. 7, No. 2, 1964, pp. 149-154.
E.R. Brown, "Fundamentals of Terrestrial Millimeter-Wave and THz Remote Sensing", International Journal of High Speed Electronic and Systems, vol. 13, No. 4, 2003, 106 pages.
Justin Romberg, "Imaging via Compressive Sampling", IEEE Signal Processing Magazine, Mar. 2008, pp. 14-20.
Emmanuel Candes, et al., "Robust Uncertainty Principles: Exact Signal Reconstruction from Highly Incomplete Frequency Information", IEEE Transactions on Information Theory, vol. 52, 2006, 41 pages.
Roberto Sorrentino, "MEMS-Based Reconfigurable Reflectarrays", Proceedings of the Second European Conference on Antennas and Propagation, EuCAP, 2007, 7 pages.
Frank Gumbmann, et al., "Millimeter-wave imaging concepts: Synthetic Aperture Radar (SAR) and Digital Beam Forming (DBF)", Frequenz, No. 63, 2009, 5-6, pp. 106-110.
Paul Corredoura, et al., "Millimeter-Wave Imaging System for Personnel Screening: Scanning $10^{\wedge}7$ Points a Second and Using No Moving Parts", Proceedings of SPIE, vol. 6211, 2006, pp. 62110B-1 to 62110B-8.
R. Sorrentino, et al., "Recent Advances on Millimetre Wave Reconfigurable Reflectarrays", EuCAP 2009 3rd European Conference on Antennas and Propagation, Mar. 2009, pp. 2527-2531.
Marco F. Duarte, et al., "Single-Pixel Imaging via Compressive Sampling", IEEE Signal Processing Magazine, Mar. 2008, pp. 83-91.
Michael Lustig, et al., "Sparse MRI: The Application of Compressed Sensing for Rapid MR Imaging", Magnetic Resonance in Medicine, vol. 58, No. 6, 2007, 42 pages.
Michael Lustig, et al., "Compressed Sensing MRI", Technical Report No. 2007-3, http://statistics.stanford.edu/~ckirby/techreports/GEN/2007/2007-3.pdf, Jul. 2007, 40 pages.

FIG. 4
$y$  $\Phi = I$  $x$
$N \times 1$  $N \times N$  $N \times 1$
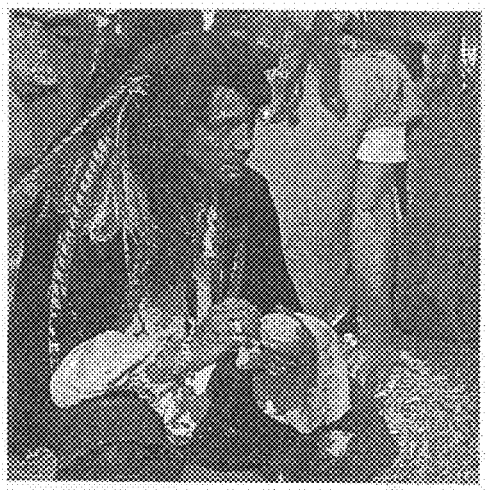
FIG. 5A
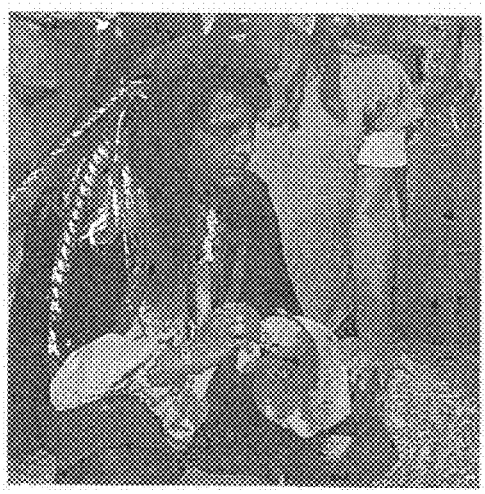
FIG. 5B

FIG. 10A
FIG. 10B
FIG. 11A
FIG. 11B
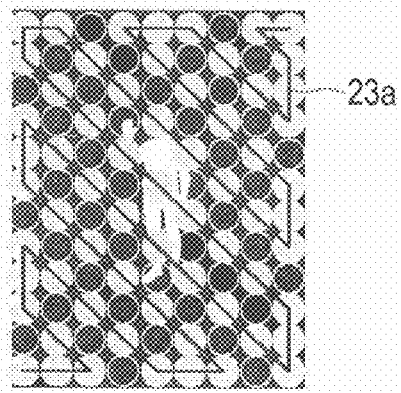
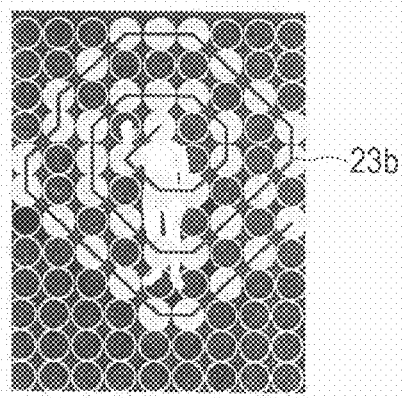
FIG. 11C
FIG. 11D
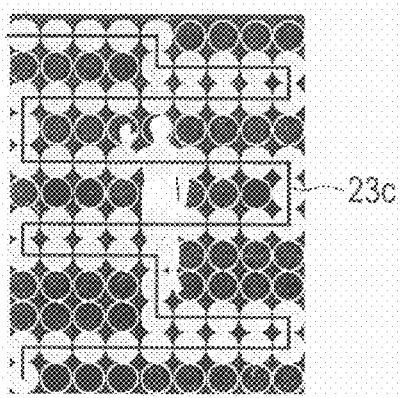
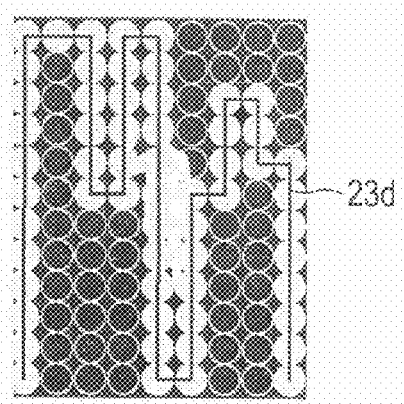

RADIOMETRIC IMAGING DEVICE AND CORRESPONDING METHOD

CROSS-REFERENCE TO RELATED APPLICATIONS

The present application claims priority of European patent application 10 158 502.4 filed on Mar. 30, 2010 and of European patent application 10 169 815.7 filed on Jul. 16, 2010

FIELD OF THE INVENTION

The present invention relates to a radiometric imaging device and a corresponding method for scanning a scene and generating a high-density signal pattern representing said scene. Further, the present invention relates to a computer program for implementing said method and a computer readable non-transitory medium.

BACKGROUND OF THE INVENTION

Millimeter waves are radio waves in the wavelength range from 1 mm to 10 mm, which corresponds to a frequency range from 30 GHz to 300 GHz. These waves have been applied to in-vehicle radar devices for measuring the distance between moving vehicles in order to prevent collisions and to high speed wireless communications for achieving transmission data rate in the order of several gigabits per second. Further, improved generation and detection techniques as well as latest improvements in the integration and miniaturization of devices operating in the millimeter wave frequency range have created a lot of interest to exploit the properties of this electromagnetic radiation. Its ability to penetrate non metal materials, including plastics, walls, clothes, smoke and fog have provided additional momentum to research on millimeter waves imaging applications. Furthermore, the achievable spatial resolution of few millimeters is very interesting in security applications like concealed weapon or explosives detection.

The millimeter waves can be used in an active or a passive way. A passive radiometric imaging system creates images by capturing the electromagnetic radiation emitted by the objects by using a radiometer. Such a passive radiometric imaging system is, for instance, known from US 2007/0221847 A1. The observed radiometric temperature of a scene is based on the following factors: emissions from scene constituents, reflections of the down-welling sky radiation by the scene, up-welling atmospheric emissions between the scene and the observer, and propagation of electromagnetic energy from the scene to the observer.

An active radiometric imaging system, on the other hand, irradiates millimeter waves to objects and creates images by detecting the transmitted or reflected waves. Millimeter waves do not produce ionizing effects, which makes this technology an attractive candidate to be employed in security applications like concealed weapon or explosives detection (existing technologies based on infrared or visible radiation can not detect concealed objects, and X-ray based systems can not be used in humans due to its ionizing effect). The possibility to see through adverse atmospheric conditions is also very interesting for automatic guided vehicles or driver assistance.

BRIEF SUMMARY OF THE INVENTION

It is an object of the present invention to provide a radiometric imaging device for imaging a scene having a reduced imaging time compared to known radiometric imaging devices for the same temperature resolution. It is a further object of the present invention to provide a corresponding method as well as a corresponding computer program for implementing said method on a computer and a computer readable medium storing such a computer program.

According to an aspect of the present invention there is provided a radiometric imaging device for imaging a scene, said device comprising:
 a radiometer for detecting radiation emitted in a predetermined spectral range from a spot of said scene and for generating a radiation signal from said detected radiation,
 a spot movement means for effecting a movement of the spot, from which the radiation is detected, to various positions,
 a control means for controlling said spot movement means to effect the movement of the spot from one position to another position so that radiation is detected at a number of spots distributed over the scene, wherein said number is lower than the number of pattern signals of said high-density signal pattern and the radiation signals generated from the radiation detected at said number of spots form a low-density signal pattern, and
 a processing means for processing the radiation signals of said low-density signal pattern and for generating said high-density signal pattern by applying compressive sensing to said low-density signal pattern.

According to another aspect of the present invention there Is provided a corresponding radiometric imaging method. According to further aspects of the present invention a computer program comprising program means for causing a computer to carry out the steps of processing and reconstructing of said radiometric imaging method according to the present invention, when said computer program is carried out on a computer, as well as a computer readable non-transitory medium having instructions stored thereon which, when carried out on a computer, cause the computer to perform said steps of the radiometric imaging method according to the present invention are provided.

Preferred embodiments of the invention are defined in the dependent claims. It shall be understood that the claimed method, computer program and computer readable medium have similar and/or identical preferred embodiments as the claimed apparatus and as defined in the dependent claims.

A passive radiometric imaging device maps the brightness temperature distribution over a given scene (often also called "field of view" (FOV)) by scanning across the scene. The temperature resolution ($\Delta T$) of the image is consequently determined by the bandwidth of the antenna (B) of the radiometer, the noise temperature ($T_{SYS}$) of the imaging device and the integration time ($\tau$) according the formula:

$$\Delta T(°K) = \frac{T_{SYS}(°K)}{\sqrt{B(Hz)\tau(s)}}.$$

As can be derived from this formula, to increase the temperature resolution of the imaging device it is necessary either to reduce the noise temperature of the imaging device or to increase the bandwidth and/or the integration time. The radiometer measures the energy radiated by the scene being imaged at each position (or pixel) where the spot, i.e. the radiation beam, is positioned. The longer the radiometer measures at an actual position, the better will be the temperature resolution at this position. On the other hand, this increases the scanning time which is a non desirable characteristic. Hence, according to an element of the present invention it is proposed to obtain a high temperature resolution while reducing the acquisition time by applying the known compressive sensing method.

Conventional approaches for sampling signals or imaging follow the Shannon's theorem, which establishes that the sampling rate must be at least twice the maximum frequency present in the signal (also called Nyquist rate). This principle has been applied in nearly all signal acquisition protocols used in consumer audio or image electronics, medical imaging devices, digital communications, etc. When the signal is bandlimited, as it used to be in the digital communications field, to convert the analog signals into the digital domain requires the usage of analog-to-digital converters (ADCs), sampling at or above the Nyquist rate, which implicitly imposes a dependency of such systems on the ADC capabilities. For other signals like images, the required sampling rate is not dictated by the Shannon's theorem but by the desired temporal or spatial resolution. However, it is common to such systems to use antialiasing low-pass filters to bandlimit the signal before sampling, and then the Nyquist rate plays also here an important role.

The compressive sensing paradigm, as described, for instance, in E. Candes, J. Romberg, and T. Tao, "Robust uncertainty principles: Exact signal reconstruction from highly incomplete frequency information," IEEE Transactions on Information Theory, vol. 52, pp. 489-509, 2006 or D. Donoho, "Compressed sensing," IEEE Transactions on Information Theory, vol. 52, pp. 1289-1306, 2006, goes against that common wisdom in data acquisition, by asserting that it is possible to recover certain signals and images from far fewer samples or measurements than those required from the traditional methods. In contrast to the conventional sampling theorem, which assumes that the amount of information in a signal is proportional to its frequency content, compressive sensing proposes a new sampling paradigm in which the information content of the signal is determined by its sparsity level or by its degree of freedom. From this point of view, the signal of interest does not need to be sampled at Nyquist rate, but at its information rate, which—in most of the cases—is much less than its bandwidth.

Briefly summarized, the compressive sensing paradigm establishes that if a signal or image is sparse enough in some known domain, it can be reconstructed from a very few number of samples (much less than what Nyquist specifies), as far as the acquisition process can be randomized in some sense.

Hence, the present invention proposes to reduce the scanning/imaging time of a radiometric imaging system by applying compressive sensing. To apply such a technique it is necessary first of all to find a measurements domain where the image has a sparse representation. Unfortunately the images obtained by a radiometric imaging device are not sparse in the acquisition domain of the radiometer, which is the total power radiated energy. Therefore the acquired radiation signals are mapped into a sparse domain. One characteristic of the images being considered here is that they are piecewise constant, and therefore one possibility is to use the total variation technique, as proposed according to an embodiment, for recovering the image from a small number of measurements, but other transformations are also possible.

The second condition to successfully apply compressive sensing is that the way the measurements are done (i.e. a measurement matrix) has to be incoherent with the representation basis being used (i.e. a representation matrix). The coherence measures the largest correlation between any two elements in these two matrices. One way to ensure this condition is to select a (pseudo-)random matrix as a measurement matrix, i.e. to randomize the acquisition process. Other measurement matrices are also possible, and depending upon the scene to be scanned a customized measurement matrix could have better incoherence than a randomly selected one. However a random one is generic and scene independent.

The solution proposed according to the present invention is to reduce the imaging scanning time by undersampling the scene of interest, i.e. by taking fewer samples than in a standard acquisition process and not at all spots, and then process the samples (e.g. reconstruct an image) by applying compressive sensing using some sparse representation of the image (like, for example, total variation). In other words, according to an element of the present invention, the spot at which radiation is detected from the scene is moved from one position to another position so that radiation is detected at a number of spots distributed over the scene, but at less than all spots as is conventionally done.

Hence, different from the conventional methods, according to which a high-density signal pattern is obtained from the radiation signals detected at a large number of spots (i.e. generally all spots), according to the present invention a low-density signal pattern is obtained from the detected radiation signals. In this context "high" and "low" shall be understood to express the relative relationship that the low-density signal pattern comprises less pattern signals than the high-density signal pattern. For instance, if an image having a resolution of n×n shall be reconstructed, i.e. if the high-density signal pattern comprises N=n×n signals, radiations signals are detected at less than N spots, i.e. the low-density signal pattern comprises (only) M (<N) radiation signals.

Consequently, the compressive sensing technology can be applied in the reconstruction process of the image leading to the desired advantages over the known radiometric imaging devices and methods, in particular leading to the desired reduction in the scanning time.

In this context, to move the spot over the scene shall be understood such that a movement over a predetermined area of the scene, e.g. an area of interest where an object (e.g. a person) to be scanned is placed, is included as well. In such a situation the spot is moved from one position to another position so that radiation is detected at a plurality of spots distributed over said predetermined area of scene, but at less than all spots of said predetermined area.

In a preferred embodiment the positions to which the spot is moved are randomly distributed over the scene (or the predetermined area). Here, "randomly" shall not be understood in a strict sense such as "truly randomly", but shall also include any pseudo-random behaviour that "simulates" a truly random behaviour and that can be generated, for instance, by a pseudo-random number generator or function. Generally holds, that the more "random" the distribution is, the better can be the results of an image reconstruction.

In a preferred embodiment said control means is adapted for controlling said spot movement means so that the number of radiation signals of said low-density signal pattern is by a factor in the range from 10% to 90%, in particular in the range from 25% to 75%, lower than the number of pattern signals of said high-density pattern. Hence, compared to conventional radiation detection, according to this embodiment radiation is detected at more than 10%, in particular more that 25%, of all spots, but less than 90%, in particular less than 75% of all spots. For instance, radiation signals may be acquired at approximately 50% of the spots resulting in a fairly good image quality of a reconstructed image. Generally, there is a trade-off between the number of spots from which radiation is acquired (i.e. the reduction of acquisition time) and the desired quality of the results of data acquisition and data processing.

Preferably, said control means is adapted for controlling said spot movement means so that the spots, from which radiation is detected, are substantially equally distributed over the scene. In this way it is ensured that in any case, i.e. even if there is no information available where one (or more) relevant object to be scanned is placed within the scene, no essential information about any object gets lost.

In a further embodiment said control means is adapted for controlling said spot movement means to effect a movement so that radiation is detected at a number of spots irregularly distributed over the scene, i.e. said spots are not regularly distributed over the scene. In this context "irregular" shall be understood such that the spots from which radiation is detected are not located at equal distances in at least one direction (preferably in both directions) of a Cartesian grid. By such an irregular detection a certain degree of randomness is achieved as required for applying the compressive sensing technique.

Preferably, according to another embodiment, said control means is adapted for controlling said spot movement means to effect a continuous movement of said spot over the scene. Thus, no jumps of the spot to distinct, in particular not neighbouring positions on the scene, are required which would increase the time for the complete acquisition of radiation signals.

A continuous trajectory may be differently implemented, for instance by a meandering trajectory according to which the spot scans over the scene line by line or column by column, or by a zig-zag or spiral trajectory. Many further trajectories can, however, be used.

In an embodiment said control means is adapted for dividing said scene into blocks of a number of pixels, selecting at least one pixel from each block and connecting said selected pixels forming a trajectory, along which the spot is moved over the scene. In this way, a more random-like distribution of the pixels and, thus, of the spots over the scene is achieved. The number of pixels in a block can generally be selected arbitrarily. Preferably, the number is not too high, e.g. below 10×10, in particular below 5×5, and the block size is equal for all blocks.

Further, the control means is preferably adapted for controlling said spot movement means in dependence on the desired resolution of an image of the scene, the distribution of an object to be scanned within the scene, and/or the sparsity of a an image of said scene.

According to still another embodiment said control means is adapted for randomly determining the direction of movement of the spot from one position to the next position.

According to a preferred embodiment the processing means is adapted for reconstructing an image by applying a l1-norm minimization algorithm to said radiation signals. The l1-norm is generally known, and the l1-norm problem (also called least absolute deviations (LAD), least absolute errors (LAE), least absolute value (LAV)) is a mathematical optimization technique similar to the popular least squares technique (l2-norm) that attempts to find a function which closely approximates set of data. In the simple case of a set of (x, y) data, the approximation function is a simple "trend line" in 2D Cartesian coordinates. The proposed method thus minimizes the sum of absolute errors (SAE) or some of "residuals" between points generated by the function and corresponding points in the data.

Applying the l1-norm minimization according to an embodiment of the present invention enables to recover an image of the scanned scene from the detected radiation signals, which are sparse in a known domain.

For effecting a movement of the spot, from which the radiation is detected, various embodiments of the spot movement means exist. According to one embodiment mechanic spot movement means are provided, in particular for mechanically moving the radiometer for effecting a movement of the spot. For instance, a motor may be provided by which an antenna of the radiometer is moved or by which the orientation of the antenna is varied, preferably in two dimensions. According to another embodiment a rotating mirror may be provided for changing the direction of the sensitivity profile of the radiometer.

According to another embodiment electronic spot movement means are provided for electronically moving the sensitivity profile of the radiometer. Such an embodiment may be implemented, for instance, by an electronic beam positioning means or an electronic beam forming means, which has the advantage that no mechanical means are provided and which generally is able to more quickly move the sensitivity profile of the radiometer compared to mechanical spot movement means.

As mentioned above, it is important for application of the compressive sensing technique that the radiation signals obtained from scanning the scene have a sparse representation in a know domain. For the applications envisaged by the present invention said known domain is preferably a total variation domain, a Fourier domain, wavelets domain or curvelets domain.

Preferably, in an embodiment a memory is provided for storing one or more lists of positions of spots, from which radiation shall be detected, wherein said control means is adapted for selecting the positions of said plurality of distributed spots from one of said lists. According to another embodiment the control means is adapted for determining the positions of said plurality of distributed spots by use of a predetermined function or distribution, in particular a uniform Bernoulli or Gaussian distribution. Hence, rather than providing a memory for storing predetermined positions or complete trajectories, a generator is provided for generating said predetermined function or distribution. For instance, a pseudo-random number generator can be applied for implementing said embodiment.

For implementing the present invention is sufficient that the radiometric imaging device comprises a single radiometer for detecting radiation emitted from a spot representing a single pixel. According to other embodiments, however, by which the total scanning time of a scene can be reduced, the radiometer comprises a line or array of radiometer units for detecting radiation emitted from a spot representing a line or array of pixels. In other words, each of the radiometer units detects radiation from a sub-spot, said sub-spots together representing said spot. In this way, radiation from a number (e.g. a line or array) of pixels is simultaneously detected. Preferably, said radiometer units are simultaneously and equally moved or their sensitivity profiles are simultaneously and equally changed. Generally, however, it is also possible that each radiometer unit is individually controlled and that their sub-spots are individually (and differently) moved.

Preferably, the radiometer is adapted for detecting radiation emitted in a millimeter wavelength range, in particular in a wavelength range from 0.1 to 100 mm, preferably from 1 to 10 mm. As mentioned above, this frequency range has the ability to penetrate non-metal materials, including plastics, walls, clothes, smoke and fog, which is an important property for applications of the presented device and method. Particularly the achievable spatial resolution of few millimeters is very interesting in security applications like concealed weapon or explosives detection. Generally, the invention is also applicable for other frequency ranges. However, some frequencies are less or not usable due to atmosphere absorption properties (the propagation attenuation is too high to receive some useful signal).

The radiometric imaging device proposed according to the present invention may be a passive or active radiometric imaging device, i.e. in both types of the radiometric imaging devices the present invention can generally be applied.

In case of an active radiometric imaging device a radio transmission means (sometimes also called illumination means) is additionally provided for emitting radiation to said scene, wherein said radiometer (or radio receiver) is adapted for detecting radiation reflected from said scene. The scene to be scanned is irradiated with radiation and radiation transmitted through or (in another embodiment) reflected from the scene is detected by the radiometer, which is thus adapted as a radio receiver. Such an active radiometric imaging device is, compared to a passive radiometric imaging, less noise sensitive and has a higher signal to noise ratio.

An active radiometric imaging device generally works similar to a passive radiometric imaging device, i.e. the spot, from which radiation is detected, is moved over the scene, while the radio transmission means, e.g. a radio transmission antenna, is emitting radiation to the whole scene by use of a wide radiation beam. Alternatively, the radio transmission means may use a narrow radiation beam and may subsequently emit radiation to the desired spots of the scene from said radio transmission means, while the radiometer (radio receiver) uses has a wide sensitivity profile so that radiation is received from the whole scene simultaneously. Still further, in an embodiment both the radio transmission means and the radiometer have a narrow beam, but commonly controlled so that both the transmission beam and the detection beam (i.e. the sensitivity profile of the radiometer) are generally always directed to the same spot on the scene, so that only radiation is detected from an area of the scene that is just being exposed to transmitted radiation.

According to another embodiment, the radio transmission means and the radiometer are combined in a monostatic radiometric unit or monostatic radar. In other words, the radio transmission means and the radiometer are combined to a monostatic active radar system, where the transmitting and receiving antenna are at the same position or implemented by the same common antenna.

Generally, part of the scanning time is wasted by focusing at the voxels surrounding the target, i.e. by acquiring radiation from spots of the scene without any object of interest, which have no useful information. According to a known solution, as disclosed in US 2007/0139248 A, it is proposed to reduce the scanning time by using an additional camera operating in the visible spectrum. Information about limits of the target (=object of interest) provided by this camera is used by the control unit to direct the antenna beam to the target, instead of scan the complete field of view (FOV). However, the visible range camera can not detect if a person being scanned has concealed objects under the clothes and therefore the known millimeter wave system has to scan the whole target.

To overcome this problem, in a preferred embodiment said control means is adapted for effecting, after said high-density signal pattern representing said scene has been generated, a movement of the spot, from which the radiation is detected, to various positions in a reduced field of view, which is smaller than the whole scene and contains an object of interest, so that radiation is detected at a reduced number of spots distributed over the reduced field of view, wherein said reduced number is lower than the number of pattern signals of a high-density signal pattern representing said reduced field of view and the radiation signals generated from the radiation detected at said reduced number of spots form a low-density signal pattern of said reduced field of view, and wherein said processing means is adapted for processing the radiation signals of said low-density signal pattern of said reduced field of view and for generating said high-density signal pattern of said reduced field of view by applying compressive sensing to said low-density signal pattern of said reduced field of view.

In even a further improved embodiment it is proposed that said control means is adapted for further stepwise reducing the field of view and for effecting a movement of the spot, from which the radiation is detected, to various positions in a further reduced field of view, wherein said processing means adapted for processing the radiation signals of said low-density signal pattern of said further reduced field of view and for generating a high-density signal pattern of said further reduced field of view.

Thus, the solution proposed according to these embodiments is to use compressive sensing to acquire different images of the scene of interest at different resolutions (in particular, at least two images (or, more generally, to obtain two high-density signal patters) using a zoom-in approach. Initially, a low resolution image of the complete FOV is used to detect the limits of the target. A new FOV is then defined that contains only the interested target and a second image with a slightly better resolution is then obtained. The procedure may continues until any suspicious concealed object is identified or concluded that not concealed object is present at all (or until an upper limit of iterations is reached).

In still a further embodiment said control means is adapted for effecting a movement of the spot, from which the radiation is detected, to various positions in a reduced field of view, which is smaller than the whole scene and contains an object of interest, so that radiation is detected at a high number of spots of the reduced field of view, wherein said high number corresponds to the number of pattern signals of a high-density signal pattern representing said reduced field of view and the radiation signals generated from the radiation detected at said high number of spots form a high-density signal pattern of said reduced field of view, and wherein said processing means is adapted for processing the radiation signals of said high-density signal pattern of said reduced field of view. Hence, in a last iteration, e.g. if the field of view is already small enough, compressive sensing is no longer applied, but from this small field of view radiation is detected from all spots covering the complete field of view, and from all the detected radiation at all spots an image is reconstructed or a high-density data pattern is obtained.

Preferably, in a further embodiment detection means are provided for detecting an object of interest in a high-density signal pattern and for providing object information about a detected object of interest, in particular the position and size of an object of interest, to said control means. This object information is then used by the control means to reduce the field of view for the next iteration and to decide if compressive sensing is to be applied in the next iteration again or if a full scan can be made, e.g. because the field of view is small enough. These detection means may use a pattern recognition algorithm, e.g. combined with an automatic target recognition algorithm. Such algorithms are, for instance, described in "Object Recognition: Fundamentals and Case Studies", M. Bennamoun and G. J. Mamic, Springer, 2002.

Alternatively or in addition in another embodiment user interface is provided for inputting and providing information about a detected object of interest, in particular the position and size of an object of interest, and/or field of view information about the position and size of a reduced field of view to said control means. Such an interface may be a computer terminal, e.g. a pointer by which a user may indicate a reduced field of view on a display screen showing a previously obtained image.

In another aspect of the present invention a radiometric imaging device is provided that scans a scene and generates a high-density signal pattern representing said scene, said device comprising:

a radiometer that detects radiation emitted in a predetermined spectral range from a spot of said scene and generates a radiation signal from said detected radiation, a spot mover that effects a movement of the spot, from which the radiation is detected, to various positions, a controller that controls said spot mover to effect the movement of the spot from one position to another position so that radiation is detected at a number of spots distributed over the scene (24), wherein said number is lower than the number of pattern signals of said high-density signal pattern and the radiation signals generated from the radiation detected at said number of spots form a low-density signal pattern, and a processor that processes the radiation signals of said low-density signal pattern and generates said high-density signal pattern by applying compressive sensing to said low-density signal pattern.

BRIEF DESCRIPTION OF THE DRAWINGS

These and other aspects of the present invention will be apparent from and explained in more detail below with reference to the embodiments described hereinafter. In the following drawings FIG. 4 shows a diagram illustrating traditional sampling, FIG. 5 shows an original image and an image reconstructed from only a portion of wavelet coefficients of the original image, FIG. 10 shows an example of the application of the total variation transform to a sample picture, FIG. 11 shows various trajectories for continuous movement of the spot.

DETAILED DESCRIPTION OF THE INVENTION

Figure 1:
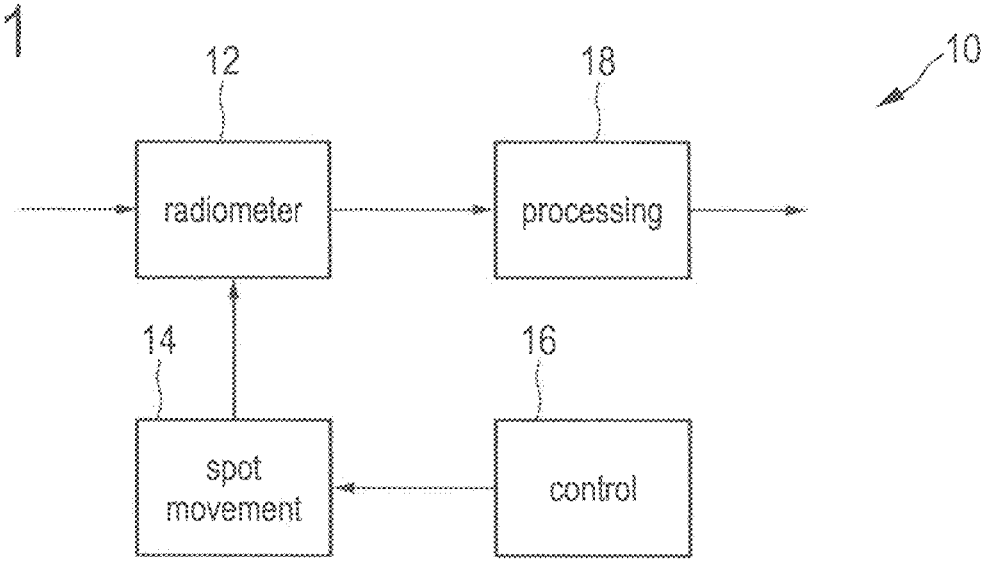
FIG. 1 shows a schematic block diagram of a passive radiometric imaging device according to the present invention.

Concealed object detection systems are targeted for entrances at places where the number of people that have access is high, and therefore a manual scanning would it be impractical due time limitation issues and error prone due to human errors: airports, customs, official buildings, schools, etc. Such a system can a) detect the presence, location, and identification of weapons (metallic and ceramic), explosive devices, and other proscribed items concealed underneath a person's clothing; and b) monitor a person for weapons (metallic and ceramic), explosive devices, and other proscribed items quickly and safely, without violating anyone's privacy.

The goal of millimeter-wavelength imaging and object detection system will be not only to locate an object of concern but also to identify what it is. This process of identification begins with detection and progresses through processes variously described as recognition and classification. Therefore, "detection" is often defined as "the process for discriminating objects of possible interest from their surroundings." An operator, however, may not know what type of object is detected but only that something was detected. Conventional walk-through metal detectors will let the operator know that metal objects have passed through the portal, but these systems do not provide the location or the identification of the type (gun versus keys) of the metal objects.

Furthermore, an object detection system to be used in such a situation has to be reliable and fast at the same time. Reliable here means that the system is able to detect objects which are bigger than certain specific size with an acceptable low number of false positive detections and a high number of true positive detections. The achievable space resolution depends on the wavelength of the system and has to be considered as a design parameter. The speed of the system will depend on the specific implementation of the acquisition unit (scanning mechanism), and on the image processing algorithms.

The simplest implementation of such a system, from the system architecture point of view, would be to use a single pair transmitter-receiver which is able to scan the scene of interest (human body, luggage, etc.) using some mechanical movement. Although simple, the acquisition time in such implementation is impractical for a concealed object detection application system (e.g. in an airport). A preferred solution typically includes some electronic scanning means, in particularly a transmitter, a receiver and/or a reflect antenna array for transmitting, receiving and/or reflecting the millimeter wave radiation to/from the object. Such antenna arrays can be constructed using traditional analog phased arrays or binary reflector arrays. In either case, the antenna array typically directs a beam of millimeter wave radiation containing a number of individual millimeter wave rays towards a point or volume in 3D space corresponding to a voxel in the scene where the object is contained. This is accomplished by programming each of the antenna elements in the array with a respective phase shift that allows the antenna element to modify the phase of a respective one of the millimeter wave rays. The phase shift of each antenna element is selected to cause all of the individual millimeter wave rays from each of the antenna elements to arrive at the target substantially in-phase. Examples of programmable/reconfigurable antenna/reflector arrays are described in U.S. Pat. No. 7,224,314.

FIG. 1 shows a schematic block diagram of the general layout of a passive radiometric imaging device 10 according to the present invention for imaging a scene. Said device 10 may, for instance, be used to scan a person in front of a (e.g. neutral) background to detect if the person carries a concealed weapon. The device 10 comprises a radiometer 12 for detecting radiation emitted in a predetermined spectral range from a spot of said scene and for generating a radiation signal from said detected radiation, a spot movement means 14 for effecting a movement of the spot, from which the radiation is detected, to various positions, a control means 16 for controlling said spot movement means 14 to effect the movement of the spot from one position to another position so that radiation is detected at a number of spots distributed over the scene 24. Said number is lower than the number of pattern signals of said high-density signal pattern and the radiation signals generated from the radiation detected at said number of spots form a low-density signal pattern. Further, the device 10 comprises a processing means 18 for processing the radiation signals of said low-density signal pattern and for generating said high-density signal pattern by applying compressive sensing to said low-density signal pattern.

Figure 2:
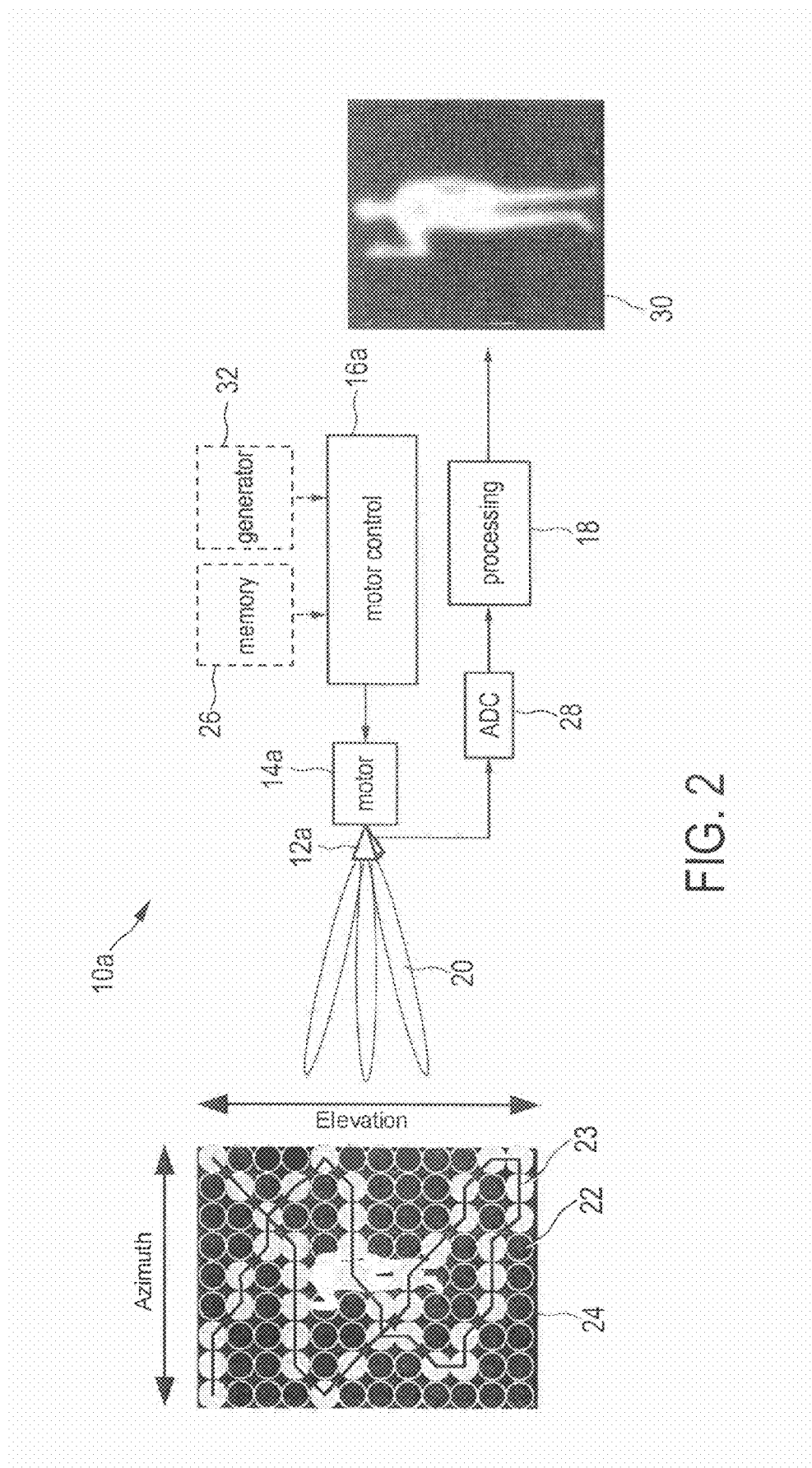
FIG. 2 shows a more detailed schematic block diagram of a first embodiment of an imaging device according to the present invention.

FIG. 2 shows a more detailed block diagram of an embodiment of a passive radiometric imaging device 10a, in which one single radiometer 12a comprises an antenna with a sharp beam 20 which defines the size of the pixel or spot 22, which has a circular shape in this embodiment, by which the scene 24 is scanned and from which radiation is detected. The radiometer 12a including the antenna is attached to a motor 14a, which represents the spot movement means 14. Said motor 14a can move the radiometer 12a, in particular the antenna of the radiometer 12a, in both elevation and azimuth directions to effect a movement of the spot 22 over the scene 24, e.g. along a predetermined trajectory 23. In this way the field of view of the scene 24, i.e. either the complete scene 24 or a predetermined area, is scanned in both dimensions.

A motor control unit 16a is provided for giving the appropriate commands to the motor 14a to move to the spot to the desired positions so that the radiometer 12a acquires radiation from said spot and generates a radiation signal. According to the present invention, however, radiation signals are only obtained from a reduced number of spots compared to the general scanning, according to which radiation is obtained from all spots. For instance, only from 50% of all spots (generally from less than 90% but more than 10% of all spots) radiation signals are obtained. Hence, according to the present invention the scanning time is reduced to conventional scanning by undersampling the scene of interest, i.e. by taking fewer samples than in a standard acquisition process. The obtained radiation signals, which form a low-density signal pattern, are then processed, e.g. a high-density signal pattern of a number of pattern signals (said number being higher than the number of radiation signals of said low-density signal pattern) and an image is reconstructed, by applying compressive sensing using some sparse representation of the image (like for example total variation).

According to an embodiment the positions, to which the spot is moved are randomly determined, e.g. selected from some predefined list or table, e.g. storing predetermined trajectories of positions to which the spot is subsequently moved. Such a list or table may be stored in a storage unit 26.

After the scanning of the scene 24 has been completed, the radiation signals obtained from the detected radiation from the various pixels (e.g. obtained by the radiometer 12a while the spot 22 has been positioned at various positions of the scene 24) are provided to a reconstruction unit 18, representing the processing means in this embodiment, preferably after digitization by an analog-to-digital (ADC) converter 28. Said reconstruction unit 18 applies a compressive sensing technique to the acquired samples to finally reconstruct the original image 30.

The exact procedure to select the positions for movement of the spot and then number of spots from which radiation is detected will depend on each application and is generally tuned to obtain the optimum results between image resolution and scanning time. In any case, the overall scanning time should be less than in the case without applying compressive sensing.

Instead of a storage unit 26 that stores predefined positions or trajectories time, a random generator 32 can be provided for randomly generating the positions, e.g. each time the spot 22 is moved to a new position the next position is determined. Said random generator 32 can, for instance, be implemented as a pseudo-random number generator, which—based on a randomly selected initial position—generates subsequent positions based on a predetermined algorithm.

Figure 3:
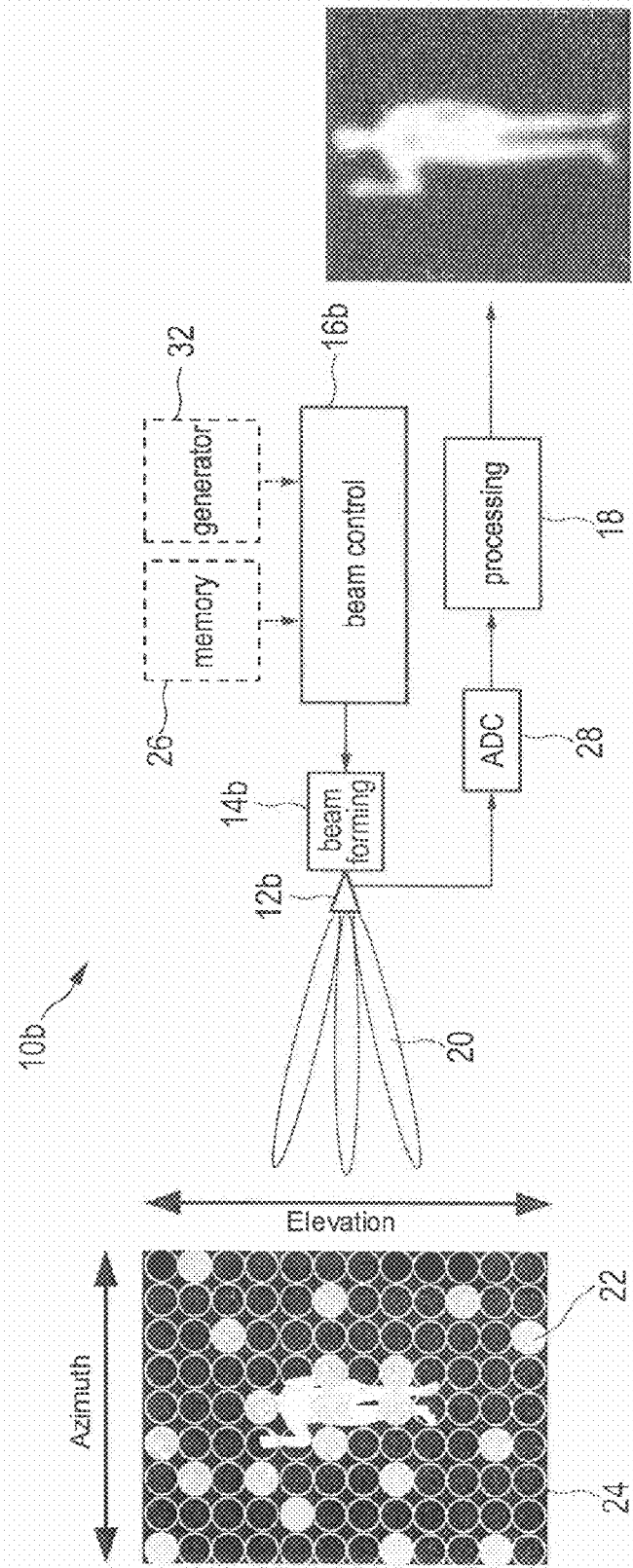
FIG. 3 shows a more detailed schematic block diagram of a second embodiment of an imaging device according to the present invention.

FIG. 3 shows a block diagram of another embodiment of a passive radiometric imaging device 10b according to the present invention. In this embodiment the radiometer 12b (including the antenna) is not mechanically moved by a motor (or other mechanical movement means) for effecting a movement of the spot 22 over the scene 24, but the electronic spot movement means 14b are provided for electronically moving/positioning the sensitivity profile of said radiometer for effecting a movement of said spot. Said electronic spot movement means 14b are, for instance, implemented by an electronic beam positioning means or an electronic beam forming means. An example of such a digital beam forming means is described by N. A. Salmon et al. in "Digital Beam-Forming for Passive Millimiter Wave Security Imaging" in Antennas and Propagation, 2007, EuCAP 2007, November 2007 pp. 1-11. These electronic spot movement means 14b are controlled by a beam control unit 16b, which—like the motor control unit 16a shown in FIG. 2—selects the various positions for movement of the spot 22.

Next, the basics of compressive sensing shall be generally explained.

The sensing mechanism of obtaining information about a signal x can be expressed as the correlation of the signal itself with a base of waveforms $\{\phi_i\}$:

$$y_k = \langle x, \phi_k \rangle, k=1, \ldots, N.$$

If for example the sensing waveforms are the Dirac delta functions, then y is a vector of sampled values of x in the time or space domain. If the sensing waveforms are sinusoids, as it happens e.g. in magnetic resonance imaging (MRI), then y is a vector of Fourier coefficients. These sensing waveforms form an orthonormal base which is called the sensing orthobase, or the sensing or measuring matrix, when the sensing operation is expressed in matrix format. FIG. 4 shows an example of this for the Dirac's deltas case.

From FIG. 4 it can also be observed that, although the signal of interest x has only three non-zero elements, all the N positions in the vector are sampled by the measuring matrix. The position in the vector of the non-zero elements is not known, and therefore it is not possible to design a measuring matrix that samples the signal x at exactly those positions. However, this raises the question about if it would be possible to design a sensing matrix which would allow us to just take a small number M of measurements in comparison with the dimension of the signal (M<<N), and still be able to recover the signal. This is exactly what compressive sensing tries to achieve: to completely recover a signal or to obtain a good very approximation of it, form only a few measurements. The success of applying the compressive sensing paradigm to a signal or image relies on two principles: sparsity, which is related to the signal of interest, and incoherence, which pertains to the sampling modality.

Figure 6:
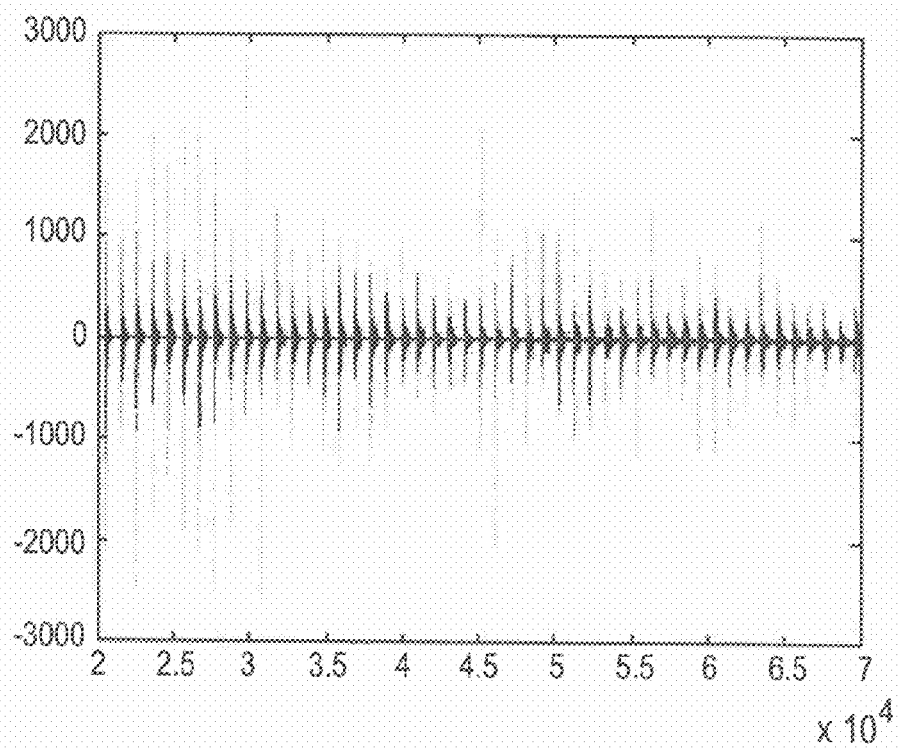
FIG. 6 shows the wavelet coefficients of the image shown in FIG. 5A.

Sparsity expresses the idea that the information rate of a signal may be much smaller than what its bandwidth suggest. In fact, many natural signals have concise representations when expressed in a conventional basis. Considering for example the (complete) image depicted in FIG. 5A and its wavelet transform depicted in FIG. 5B. Although nearly all the image pixels have non-zero values, as shown in FIG. 6, most of the wavelet coefficients are small and the relatively few large ones capture most of the information: the difference between the original image (FIG. 5A) and the reconstructed image (FIG. 5B) obtained by using only the 25.000 largest coefficients is hardly noticeable.

Let x be a real-valued, finite-length, one-dimensional discrete time signal which can viewed as an N×1 column vector in $\mathbb{R}^N$ with elements x[n], n=1, 2, ..., N. Any signal in $\mathbb{R}^N$ can be represented in terms of a orthonormal basis of N×1 vectors $\{\psi_i\}$ i=1, 2, ..., N. Using the N×N basis matrix $\Psi=[\psi_1, \psi_2 \ldots \psi_N]$ with the vectors $\{\psi_i\}$ as columns, a signal x can be expressed as $$x = \sum_{i=1}^{N} s_i \psi_i \text{ or } x = \Psi s$$

where s is the N×1 column vector of weighting coefficients $s_i = \langle x, \psi_i \rangle = \psi_i^T x$. Clearly and x are equivalent representations of the same signal but in different domains.

The signal x is K-sparse if it is a linear combination of only K basis vectors; that is, only K of the $s_i$ coefficients are non-zero and (N-K) are zero. The case of interest is when K<<N. The signal x is compressible if the previous representation has just few large coefficients and many small coefficients.

The measurement matrix φ must allow the reconstruction of the length-N signal x from M<N measurements (the vector y). Since M<N, this problem appears ill-conditioned, but if x is K-sparse and the K locations of the non-zero coefficients in s are known, then the problem could be solved provided M≥K. A necessary and sufficient condition for this simplified problem to be well conditioned is that, for any vector v sharing the same K non-zero entries as s and for some >0

$$1 - \varepsilon \leq \frac{\|\Phi\Psi v\|_2}{\|v\|_2} \leq 1 + \varepsilon.$$

That is, the matrix Ω=ΦΨ must preserve the lengths of these particular K-sparse vectors. Of course, in general the locations of the K non-zero entries in s are not known. However, a sufficient condition for a stable solution for both K-sparse and compressible signals is that Q satisfies this equation for an arbitrary 3K-sparse vector v. This condition is referred to as the restricted isometry property (RIP). A related condition, referred to as incoherence, requires that the rows $\{\phi_j\}$ of Φ cannot sparsely represent the columns $\{\psi_i\}$ of Ψ (and vice versa).

Direct construction of a measurement matrix Φ such that Ω has the RIP, requires verifying the equation for each of the $\binom{N}{K}$ possible combinations of K non-zero entries in the vector v of length N. However, both the RIP and incoherence can be achieved with high probability simply by selecting φ as a random matrix.

Suppose a pair (φ,Ψ) of orthobases is provided in $\mathbb{R}^N$. The first basis Φ is used for sensing the signal x and the second one is used to represent x. The coherence between the measurement basis φ and the representation basis Ψ is defined as:

$$\mu(\Phi, \Psi) = \sqrt{N} \cdot \max_{1 \leq k, j \leq n} |\langle \phi_k, \psi_k \rangle|$$

$$\mu(\Phi, \Psi) \in [1, \sqrt{N}].$$

That is, the coherence measures the largest correlation between any two elements of Φ and Ψ. If Φ and Ψ contains correlated elements, the coherence is large, otherwise it is small. In any case it can be demonstrated that $\mu(\Phi,\Psi) \in [1,\sqrt{N}]$.

Compressive sensing is mainly concerned with low coherence pairs. For example, in the classical sampling scheme in time or space where Φ and Ψ are the spike and Fourier basis respectively, the coherence is μ=1 and, therefore maximal incoherence is given. In another example, wavelets are taken for Ψ and noiselets for Φ. In the case of Haar wavelets $\mu=\sqrt{2}$ and in the case of Daubechies D4 and D8 the incoherence is about 2.2 and 2.9 respectively.

However, the most interesting result is that random matrices are largely incoherent with any fixed basis Ψ. Just select an orthobasis Φ uniformly at random, e.g. by orthonormalizing N vectors sampled independently and uniformly on the unit sphere. Then, whit high probability, the coherence between Φ and Ψ is about $\sqrt{2\log N}$. By extension, random waveforms with independent identically distributed (i.i.d.) entries like Gaussian or ±1 binary entries will also exhibit very low coherence with any fixed representation basis Ψ.

Next, the compressive sensing theorem shall be explained. Let x be a signal in $\mathbb{R}^N$ which is K-sparse in the basis Ψ. Select M<<N measurements in the Φ domain uniformly at random. Then if $$M \geq C \cdot \mu^2(\Phi,\Psi) \cdot K \cdot \log N$$

for some positive constant C, then the signal x can be exactly recovered with overwhelming probability. The recovering of the signal x is done by means of a convex minimization which does not assume any knowledge about the number of non-zero coordinates of x, their locations or amplitudes, which are assumed to be all completely unknown a priori. It is just needed to run the algorithm, and if the signal happens to be sufficient sparse, exact recovery happens.

The role of the coherence is obvious from the theorem: the smaller the coherence, the fewer samples need to be taken. If μ is equal or close to one, then a number of samples in the order of K log N suffices to recover the signal. For practical cases it is used to take M at least three times larger than M≥3K.

Figure 7:
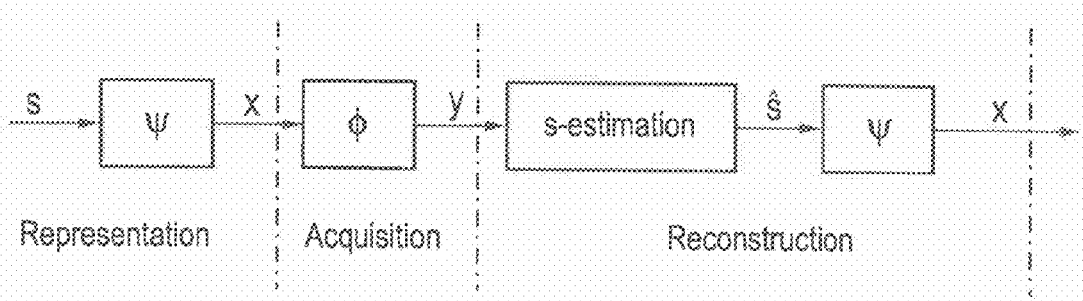
FIG. 7 shows a diagram illustrating the steps of a compressive sensing method in general.

The signal reconstruction algorithm must take the M measurements in the vector y, the random measurement matrix Φ and the representation basis Ψ and reconstruct the N-length signal x as schematically depicted in FIG. 7.

In order to reconstruct x the coefficients s must be estimated. As it is tried to recover a sparse signal, the problem can be reduced to find out, among all the possible coefficient vectors s satisfying the observed measurements (that is y=ΦΨs), the sparsest one ($\hat{s}_p$), that is, the one with the maximum number or zero coefficients or, the other way around, the one with the minimum number of non-zero coefficients. Mathematically this can be formulated as solving the following minimization problem:

$$\hat{s}_p = \min_s \|s\|_p \text{ subject to } y = \Phi\Psi s = \Omega s$$

where $\Omega \equiv \Phi\Psi$ and $\|.\|_p$ denotes the $l_p$ norm defined by $$\|s\|_p = \left(\sum_{i=1}^{N} |s_i|^p\right)^{1/p}.$$

The norm $l_0$ (p=0) counts the number of non-zero entries in s. Therefore the minimization problem finds out what is looked for: the $\hat{s}_p$ with less non-zero coefficients. Unfortunately this minimization problem is both numerically unstable and NP-complete, requiring and exhaustive enumeration of all $$\binom{N}{K}$$

possible locations of the non-zero entries in s.

Figure 8:
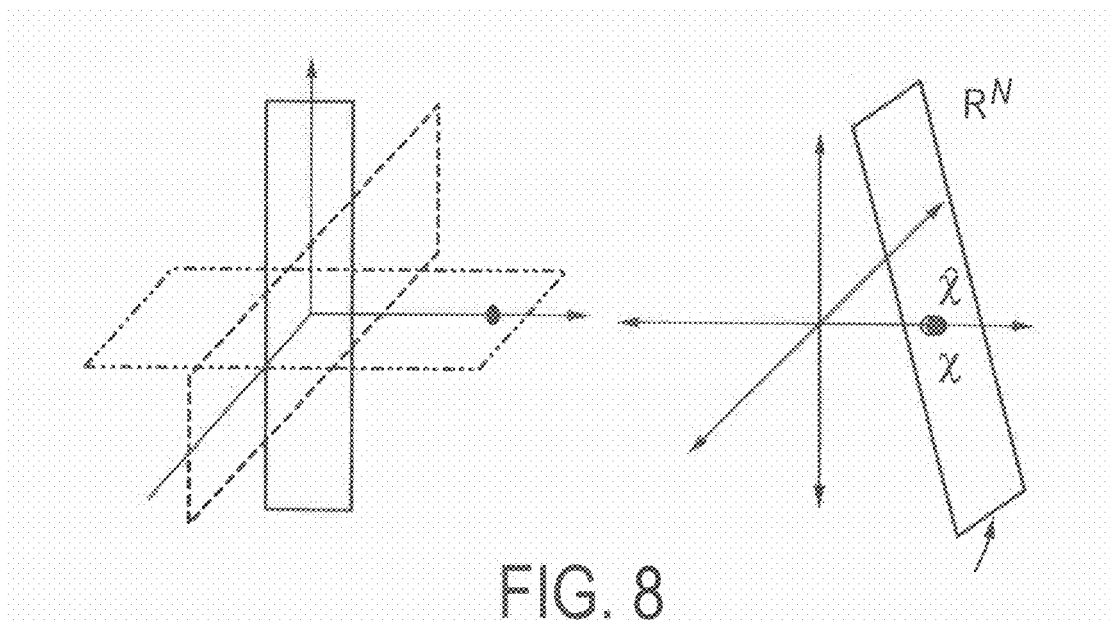
FIG. 8 shows sparse vectors in $\mathbb{R}^3$ and norm l0.

The problem can be better visualized by means of the space geometry. Vectors in $\mathbb{R}^3$ with K=1 and K=2 represent a plane and a point located at one coordinate axis respectively as shown in FIG. 8. The minimization problem with the $l_0$-norm would find out exactly those N-dimensional K-sparse surfaces but, as above mentioned, this problem can not be solved.

Figures 9A, 9B:
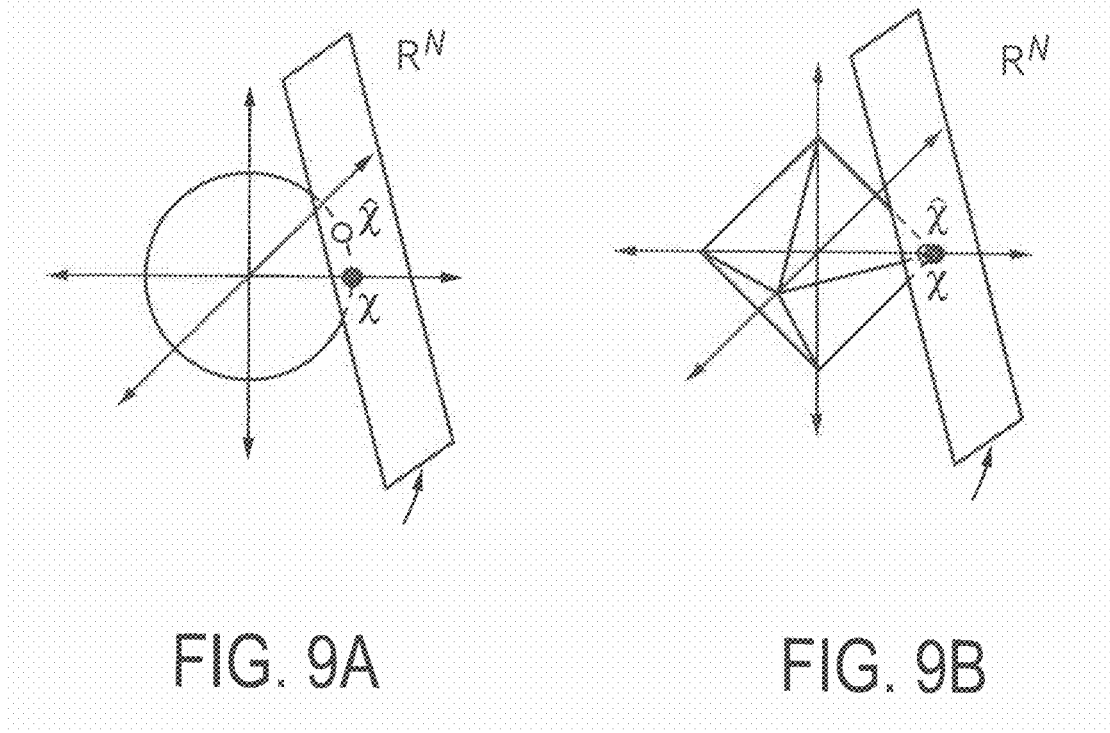
FIG. 9 shows geometrical solutions for norms l2 and l1.

The classical approach to solve inverse problems like this one is to find the vector with the minimum energy, that is, with the minimum $l_2$-norm. The problem in this case can be solved using linear programming techniques, but the solution would almost never be the K-sparse solution that is looked for in the field of application of the present invention, but a non-sparse one with many non-zero coefficients. Geometrically the minimization problem with the $l_{12}$-norm finds out the point-of-contact with a minimum energy hypersphere but, due to the random orientation of the surface, that contact point will be unlikely to be located at any coordinate axis, and therefore it would not be a sparse solution as illustrated in FIG. 9A.

Surprisingly, the optimization based on $l_1$-norm can exactly recover K-sparse signals and closely approximate compressive signals. As it can be seen in FIG. 9B, the $l_1$ ball has points aligned with the coordinate axis. Therefore, when the $l_1$ ball is blown up, it will first contact the surface in one of these points, which is exactly where the sparse vector s is located.

This problem of recovery of a signal of order N from a number of measurements M<<N is combinatorial and NP-hard. Thus, a series of pursuit methods were developed to reduce computational complexity by searching efficient but non-optimal approximations.

The $l_1$ minimization principle, also known as Basic Pursuit (BP), tries to find the representation of a signal whose coefficients have minimal $l_1$ norm. This is done by iterative improving an initial basis until no improvement is possible, at which point the solution is achieved. This requires the solution of a convex optimization problem which can be reformulated as a linear programming problem (LP) and therefore, any algorithm from the LP literature can be considered as a candidate for solving the BP optimization problem. Some of these candidates are for example the simplex algorithm, the slow but extremely accurate interior point algorithm, the fast first-order gradient projection algorithm, etc.:

$$\min_x \|x\|_1 \text{ subject to } \Phi x = y$$

Several variations of the basic $l_1$ minimization problem have been also proposed like the quadratic relaxation, also known by LASSO, $$\min_x \|x\|_1 \text{ subject to } \|\Phi x - y\|_2 \leq \varepsilon$$

or the Dantzing selector $$\min_x \|x\|_1 \text{ subject to } \|\Phi^T(\Phi x - y)\|_\infty \leq \varepsilon$$

While BP is a principle of global optimization without any specified algorithm, another recovery technique called Orthogonal Matching Pursuit (OMP) is actually an iterative algorithm, which does not explicitly seek for any overall goal, but merely applies a simple rule repeatedly. If OMP is compared with the simplex algorithm for BP, the first one starts from an empty model and builds up a signal model at each step. On the contrary, the BP-simplex starts from the full model and tries to improve it by taking relatively useless terms out of the model in every step.

The algorithm consist basically in select a first "active" component by finding out which column of Φ is most correlated with y and subtract off of y to form the residual y'. Then the procedure is repeated for with y' as starting active component. The algorithm orthogonalizes the "active set" between iterations and it is very fast for small scale problems. However, it is not very accurate or robust for large signals in presence of noise.

For large systems, a good approximation to the sparsest solution can be obtained by iterative thresholding algorithms running much more rapidly than general solvers. The idea is to guess a solution $y_k$ and backproject it to get an estimated $x_k = \Phi T \Phi y_k$. This one is then thresholded to obtain $y_{k+1}$. It works since in the sparse signals the $x_k$ will be big in the active set and very small elsewhere. Is a procedure analog to BP but it is very fast and works very well for sparse signals and relatively fine for recovering approximately sparse (compressible) signals.

A sparsifying transform is an operator mapping a vector of image to a sparse vector. An extensive research in sparse image representation in the recent years has produced a library of diverse transformations that can sparsify many different types of images. For example, piecewise constant images can be sparsely represented by spatial finite-differences (i.e. computing the difference between neighbouring pixels), because away from boundaries, the differences vanishes. The sparsity level is equal to the number of "jumps" in the image. This is similar to do a high-pass filtering operation.

Using the sparsifying property of the Total Variation (TV) transform, and considering that the TV norm of an object is approximately the $l_1$ norm of its gradient, the compressive sensing recovery problem can be reformulated as:

$$\min_x TV(x) \approx \|\nabla x\|_1 \text{ subject to } \Phi x = y$$

This is also a convex problem which can be solved with interior point methods. It is an accurate and robust minimization method for recovering images, although it can be slow.

Applying these general considerations in the proposed passive radiometric imaging device and method means that to the acquired detection signals a l1-norm minimization algorithm, as generally applied above, is applied. However it is important to note that in this case fewer measurements are taken than in a normal scanning, through which the necessary incoherence is achieved according to the present invention.

Taking as example the scene 24 shown in FIG. 2 which can be represented as a vector x of length N. As this picture is obviously piecewise constant it can be sparsified by applying the total variation (TV) transform. This sparsity transformation is obvious by just looking at the result of calculating the total variation of the image. A second image using the reference picture Lena is shown in FIG. 10A to appreciate the sparsity effect of the TV transform in a more general image (as shown in FIG. 10B). In other words, this TV transform obtains a sparse representation when it is applied to a piecewise smooth image. The radiometric images, which are dealt with by the present invention, are also piecewise constant and therefore the TV transformation will produce a sparse image too.

A radiometer produces an output voltage which is proportional to the Plank's law that describes the spectral radiance of electromagnetic radiation at all wavelengths from a black body at temperature T:

$$I(f, T) = \frac{2hf^3}{c^2} \frac{1}{e^{\frac{hf}{kT}} - 1}$$

where h and k are the Planck's and Boltzmann's constant respectively, f is the frequency, c is the speed of light and T is the temperature of the body being measured. This formula represents the emitted power per unit area of emitting surface, per unit solid angle, and per unit frequency (SI units: J·s$^{-1}$·m$^{-2}$·sr$^{-1}$·Hz$^{-1}$).

To calculate the total energy received in the radiometer (irradiance) per unit area of radiating surface, it is necessary to integrate the spectral radiance over the complete frequency band of the radiometer-receiver system.

$$J(T) = \frac{2h}{c^2} \int_{f_{min}}^{f_{max}} \frac{f^3}{e^{\frac{hf}{kT}} - 1}.$$

Furthermore, to obtain the total radiated energy per spot (pixel) this value has to be multiplied by the area covered by one spot (A), which in turns depends on the radiation pattern of the antenna element:

$$J(T) = A\frac{2h}{c^2} \int_{f_{min}}^{f_{max}} \frac{f^3}{e^{\frac{hf}{kT}} - 1}.$$

The radiometer receives also noise mixed with the signal. This noise comes from several sources, but this is out of the scope of this invention and therefore will be not treated here. It is enough to know that it is necessary to collect sufficient energy to compensate the incoming as well as the own system noise. This can be done increasing the integral interval (the bandwidth) or collecting and summing up the energy during a certain amount of time (integration time):

$$J(T) \cdot \tau = \left[\frac{A2h}{c^2} \int_{f_{min}}^{f_{max}} \frac{f^3}{e^{\frac{hf}{kT}} - 1}\right] \cdot \tau.$$

Therefore, the process of scanning the scene with a device like the one depicted in the FIG. 2, employing a pixel selection can be described as taking the measurements:

$$y = \Phi x = \Phi_{MN} \cdot \begin{bmatrix} \left[\frac{2hA\tau}{c^2}\right] \int_{f_{min}}^{f_{max}} \frac{f^3}{e^{\frac{hf}{kT_1}} - 1} \\ \vdots \\ \left[\frac{2hA\tau}{c^2}\right] \int_{f_{min}}^{f_{max}} \frac{f^3}{e^{\frac{hf}{kT_N}} - 1} \end{bmatrix}$$

where the measurement matrix will select (e.g. randomly) which M<<N pixels will be acquired The desired reconstruction of the radiometric image is then achieved by applying the total variation version of the l1 minimization algorithm described above using some known linear program method like the basis pursuit algorithm or some non-linear algorithm like the Fletcher-Reeves conjugate gradient iterative scheme described in R. Fletcher and C. M. Reeves, "Function minimization by conjugate gradients", The computer Journal, vol. 7, no. 2, pp. 149-154, 1964. The minimization algorithm will find the sparsest image in the total variation domain that matches the measurements.

The l1-minimization is a well known technique that has generally also been briefly explained above. Furthermore, the linear programs or non-linear algorithms available to solve convex problems like a l1-minimization problem are also well known.

As shown above, in a single pixel passive radiometric imaging device the scan of the narrow antenna beam across the scene of interest can be basically implemented by electronic or mechanical scanning. In the first case (as shown in FIG. 3), the antenna beam can be electronically directed to a desired spot in the scene. The switching time between two spots does not depend on the distance between these sports in the scene. Therefore in this case, it is possible to do the acquisition purely random (including pseudo-random), i.e. some of the pixels in the scene are randomly selected. With the acquired pixels and the measurement (random matrix), a compressive sensing processing unit (e.g. a reconstruction unit) applies an l1-norm minimization algorithm, e.g. to reconstruct an image.

Regarding the second case, namely the mechanical implementation, there are several possibilities. Such an implementation is shown in FIG. 2. In such an implementation, a total random acquisition like in the electronic steered case (FIG. 3) is not the preferred embodiment since reading independent pixels at different positions in the scene implies time consuming displacements of the motor for repositioning, increasing the overall scene scanning time.

The selection of the samples to acquire in a raster solution (motor based) thus preferably fulfils two requirements for the application of compressive sensing. First, the motor with the sensor unit should be able to follow the path (trajectory) in a continuous way, i.e. it should not go from one position to another position which is more than one position away. Second, the path does not need to have a concrete form. The more random-like the path looks like, the better will be the recovering results. Preferably, however, the area of the image covered by the path is preferably equally distributed. In other words, to recover the image with a reduced number of M samples (forming the low-density signal pattern) out of the total number N (M<<N) (forming the high-density signal pattern), if the scene (or the predetermined area of the scene) is divided into M/2 non-overlapped parts of same size, with high probability, every one of these parts will include al least one sample.

According to preferred embodiments it is proposed in this case to program the motor movement to do the scanning by following predetermined or on-the-fly determined (e.g. random) trajectories across the scene. One of such trajectories is shown in FIG. 2, further examples with possible trajectories are shown in FIG. 11.

In the embodiment shown in FIG. 2 a trajectory 23a following a zig-zag path across the scene 24 which is suitable for scenes where the information is equally distributed across the scene space.

In another embodiment shown in FIG. 11A the motor follows a spiral path 23b, which is more adequate when most of the information is concentrated in the centre of the scene 24. The scanning is then preferably restricted to such a predetermined (here central) area where most (or all) of the information is concentrated. Generally, the most appropriate path has to be selected depending upon the scene's information distribution (spiral, zigzag, etc.), its sparsity (the more sparse the less samples are needed to recover an image) and the required resolution for the recovered image. For doing that, a separate path selection unit (not shown in FIG. 2), which can also be implemented by or within the control unit 16a, sends the corresponding commands to the motor 14a to scan the scene 24 following the selected path. For this purpose a library of possible paths, which the user can select, may be provided in the memory 26, or it may also be possible to define new paths, e.g. within the generator 32.

The third embodiment of a possible trajectory 23c illustrated in FIG. 11C is a derivation from a standard full scanning where the sensor scans the lines in the azimuth direction partially or completely, but the elevation direction is randomly selected. This is, for instance, realized in that the motor control unit 16a firstly selects randomly which lines (or partial lines) in the azimuth direction will be scanned. Then it orders these lines in such a way that the motor 14a can follow an uninterrupted movement and does not need to move back to scan a previous line.

In a fourth embodiment of a possible trajectory 23d illustrated in FIG. 11D the motor 14a scans the lines in the elevation direction partially or completely, while the azimuth direction is randomly selected. The motor control unit 16a firstly selects randomly which lines (or partial lines) in the elevation direction will be scanned. Then it orders these lines in such a way that the motor 14a can follow an uninterrupted movement and does not need to move back to scan a previous line.

Figure 14A:
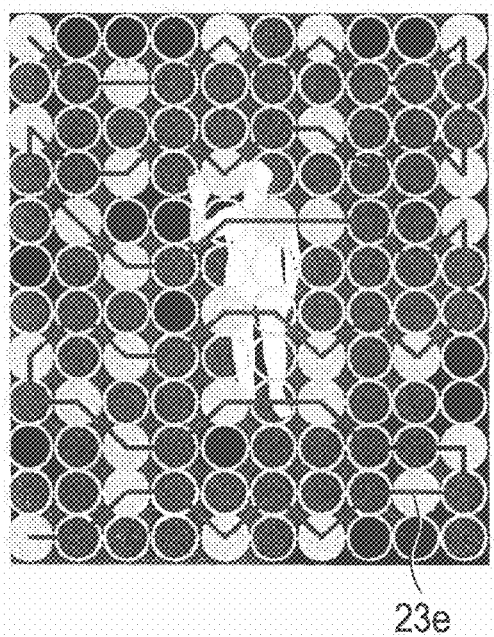
FIG. 14 illustrates another embodiment of a trajectory and the way to create the trajectory.

Still another embodiment of a possible trajectory 23e is shown in FIG. 14A. This trajectory 23e aims at achieving a more random-like distribution of the compressive samples. For this purpose the path selection unit (or the control unit) divides the field of view into blocks of a predetermined number (few) pixels (e.g. 2×2 or 3×3 pixels). From each of these blocks one pixel is selected randomly. Finally the selected pixels in every two continuous blocks are linked through one path which is selected from all possible paths that connect these two pixels.

Figure 14B:
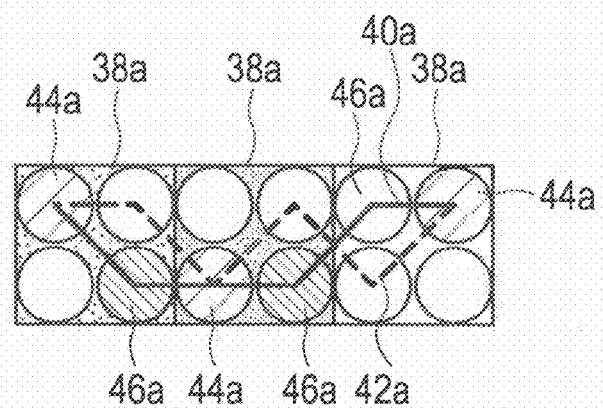
Figure 14C:
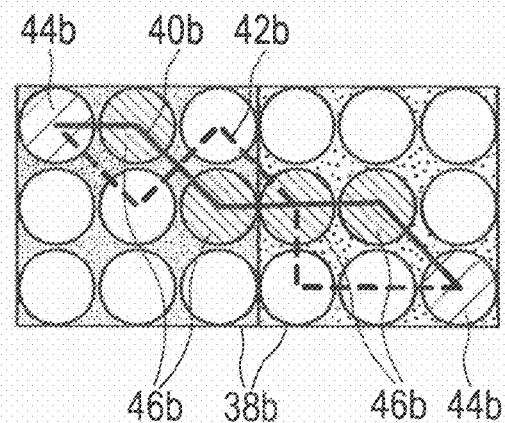

FIG. 14B shows an example of using blocks 38a of 2×2 pixels, FIG. 14C an example of using blocks 38b of 3×3 pixels. Further, possible paths 40, 42 are shown which link together the selected pixels 44a, 44b for the 2×2 and 3×3 cases by further selecting pixels 46a, 46b which connect the selected pixels 44a, 44b to result in a continuous trajectory. The solid lines 40a, 40b are the selected link paths and the dashed lines 42a, 42b are other (non-selected) possible paths. With this embodiment a more uniform distribution of the pixels across the scene is achieved, as shown in FIG. 14A, in which the trajectory 23e is generated using blocks of 2×2 pixels.

In another embodiment (shown in FIG. 2), a random path is generated, e.g. using an algorithm that decides the next scanning point selecting quasi-randomly between one of eight possible movements: up, down, right, left, up-left, up-right, down-left, down-right. The algorithm has to take care of which movement is possible depending upon the actual position. For instance, if the actual pixel is in the upper left corner, only right, down and left-down movements are possible. Furthermore, it has also to avoid that the motor 14a scans twice over the same pixel and as a consequence of this, it has to avoid movements that could end in a deadlock for the path generation.

Figure 12:
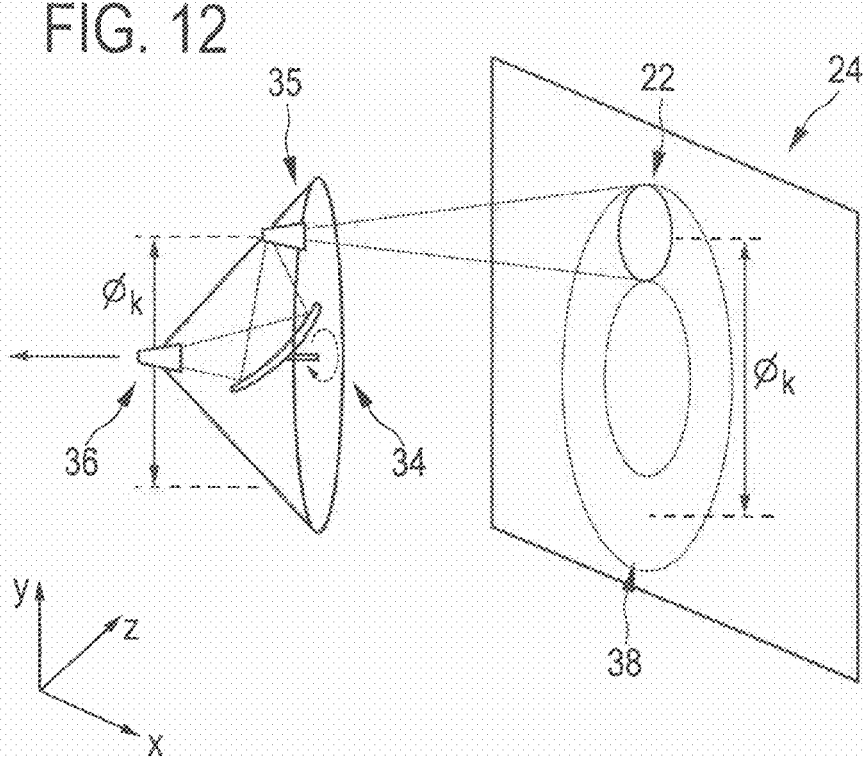
FIG. 12 shows another embodiment of a radiometer for use in an apparatus according to the present invention.

Another possibility for a mechanical implementation is to use a fixed antenna 36 combined with a rotating mirror 34 (or reflector) and a conical reflector 35, which concentrate the radiated energy into the receiving antenna 36. An example of such an implementation is shown in FIG. 12. In this type of configuration the antenna spot 22 follows a circular trajectory across the scene 24 caused by the rotational movement of the mirror 34. At the same time, the group formed by the rotating reflector 34 with the conical reflector 35 and the antenna 36 are laterally displaced along the scene 24. Varying the rotating and translating movement of the acquisition system and their velocities, multiple different trajectories for the antenna beam spot 22 across the scene 24 can be generated.

The acquisition module can then be programmed in such a way, that only a reduced number of samples is collected following a predetermined trajectory.

Figure 13:
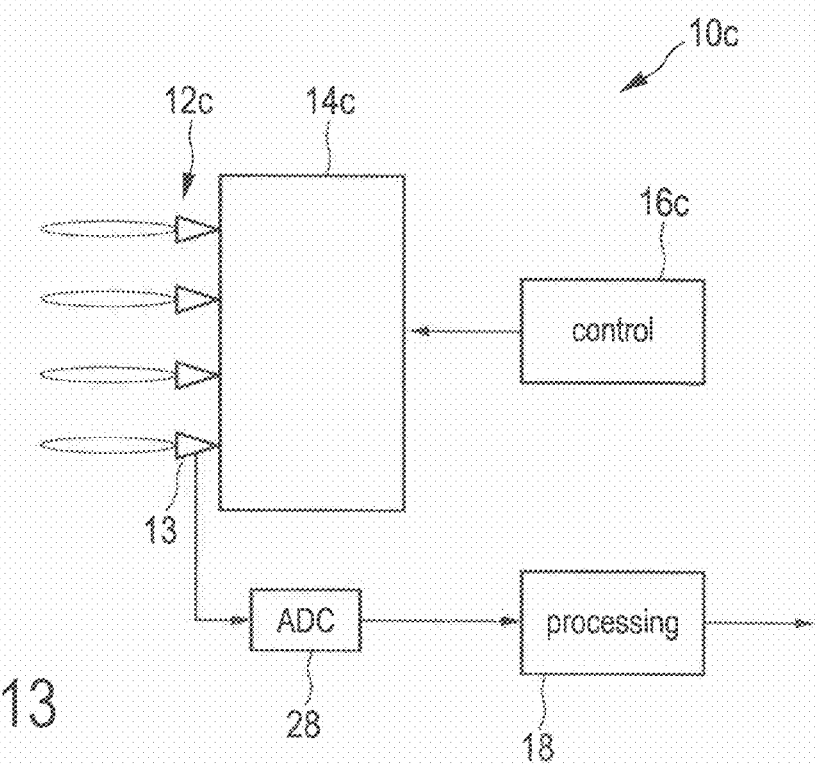
FIG. 13 shows a schematic block diagram illustrating a third embodiment of an imaging device according to the present invention.

The proposed idea is not limited to a passive radiometric imaging device using a single radiometer, as shown in FIGS. 2 and 3, which scans the scene sequentially. It can also be applied to a device 10c employing a radiometer 12c comprising multiple radiometer units 13 in a line or array distribution, as schematically depicted as an embodiment in FIG. 13. The spots of the individual radiometer units 13 are moved by the spot movement means 14c under control of the controller 16c, wherein the spots can either be individually (e.g. differently) moved, or can be simultaneously and identically moved (e.g. into the same direction, with the same speed, . . . ). Hence, with such an embodiment measurement time can be saved compared to an embodiment having only a single radiometer unit 13 due to simultaneous measurement of radiation from various spots.

Alternatively, it is also possible that one radiometer unit (or a first group of radiometer units) is detecting radiation while the spot(s) of another radiometer unit (or another group of radiometer units) is (are) moved to another position(s).

Figure 15:
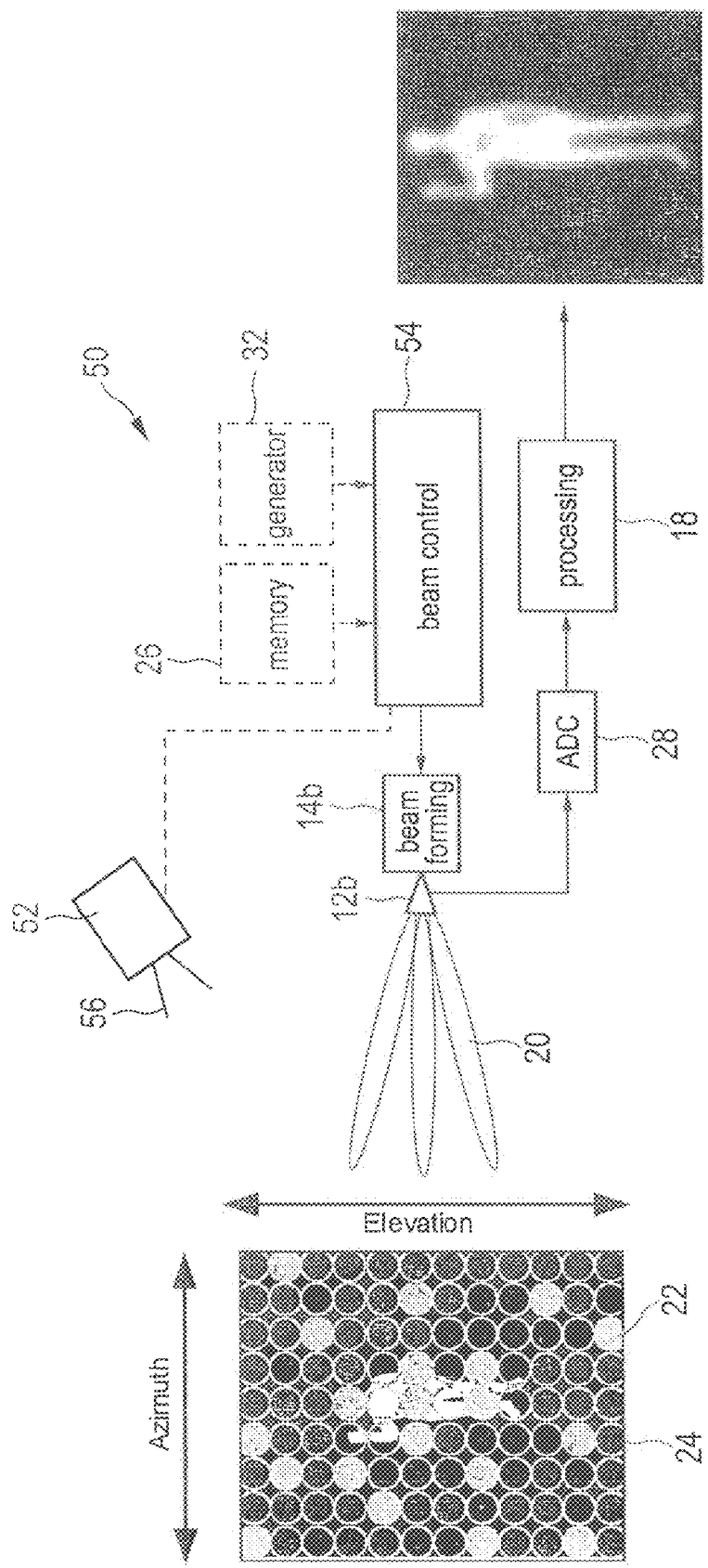
FIG. 15 shows a schematic block diagram illustrating an embodiment of an active imaging device according to the present invention.

An embodiment of an active radiometric imaging device 50 according to the present invention is shown in FIG. 15. In contrast to the above explained embodiments of a passive radiometric imaging device, in particular the embodiment 10b shown in FIG. 3, this active radiometric imaging device 50 additionally comprises a radio transmission unit 52 configured to emit radiation to the scanned scene 24, e.g. according to a radio transmission signal received from the control unit 54. The scene 24 is thus actively irradiated with millimeter waves and the radiometer 12b detects the waves reflected from the scene 24 (or transmitted through the scene 24, which is not done here in this embodiment). The active radiometric imaging device 50 is, compared to passive radiometric imaging devices, generally less noise sensitive and has a higher signal strength. The above-mentioned gist of the present invention to use compressive sensing to reduce the scanning time is, however, independent of whether an active or passive radiometric imaging device is used and can be applied in both types of devices. The general structure of the active radiometric imaging device 50 is therefore the same and comprises the same further elements as the passive imaging device explained above, in particular with reference to FIG. 3.

In the embodiment shown in FIG. 15 the radio transmission unit 52 emits radiation onto the whole scene 24 by use of a wide radiation beam 56. Alternatively, it is possible (not shown) that the radio transmission unit 52 uses a narrow beam that is scanned over the scene 24 (or directed to the desired spots) and that the radiometer 12b uses a wide beam 20 for simultaneous reception of radiation from the complete scene 24. In still another embodiment both the radiometer 12b and the radio transmission unit 52 may use a narrow beam, but they must then be controlled such that they are simultaneously directed to the same spot.

It has to be noted that the compressive sensing algorithm is also applicable to monostatic active radar systems, where the transmit and receive antenna is at the same position. The processing is the same in this case. Instead of a separate radio transmission unit a combined TX-/RX-antenna is used then, which is configured to emit radiation onto the scene 24 as well as to detect the waves transmitted through or reflected from the scene 24. By use of a switching unit the antenna is switched from a transmitting mode to a detection mode for different time intervals.

As mentioned above, a typical application of a concealed objects and weapon detection system, i.e. also of a radiometric imaging device, is a standoff detection system, where the target (usually a person; also called object of interest) is scanned from a certain distance. US 2007/0139248 A describes such a system. To reduce the scanning time it is proposed there to use an additional camera operating in the visible spectrum. The target limits information provided by this camera is used by the system to direct the antenna beam to the target, instead of scan the complete field of view (FOV). However, the visible range camera can not detect if a person being scanned has concealed objects under the clothes and therefore the millimeter wave system has to scan the whole target.

Hence, the present invention, in further embodiments, tries to reduce the scanning/imaging time of radiometric imaging device by applying compressive sensing and by using a zoom-in approach. Generally, this idea can be used in both passive and active radiometric imaging devices, but is preferably applicable in active radiometric imaging devices.

A condition to successfully apply compressive sensing is that the measurement matrix needs to be incoherent with the representation matrix being used. The coherence measures the largest correlation between any two elements in these two matrixes. The easiest way to ensure this condition is to select a (pseudo-) random matrix as a measurement matrix, i.e., the acquisition process needs to be randomized. Ideally, to achieve high incoherence, the samples may be randomly selected following some known distribution like Bernoulli, Gaussian, etc. Other measurement matrixes are also possible, and depending upon the scene to be scanned a customized measurement matrix could have better incoherence than a randomly selected one. However, a random measurement matrix is generic and scene independent.

During the scanning of the scene of interest, the complete FOV of the scene is generally covered. However, in most of the cases, only the part of the scene where the target is located is of interest. Therefore some time is wasted scanning the empty space surrounding the target. The idea proposed according to preferred embodiments of the present invention is to perform the scanning of the scene using a zoom-in approach, wherein the resolution of the reconstructed image may be increased as the area scanned (i.e. the field of view) is being reduced.

Figure 16:
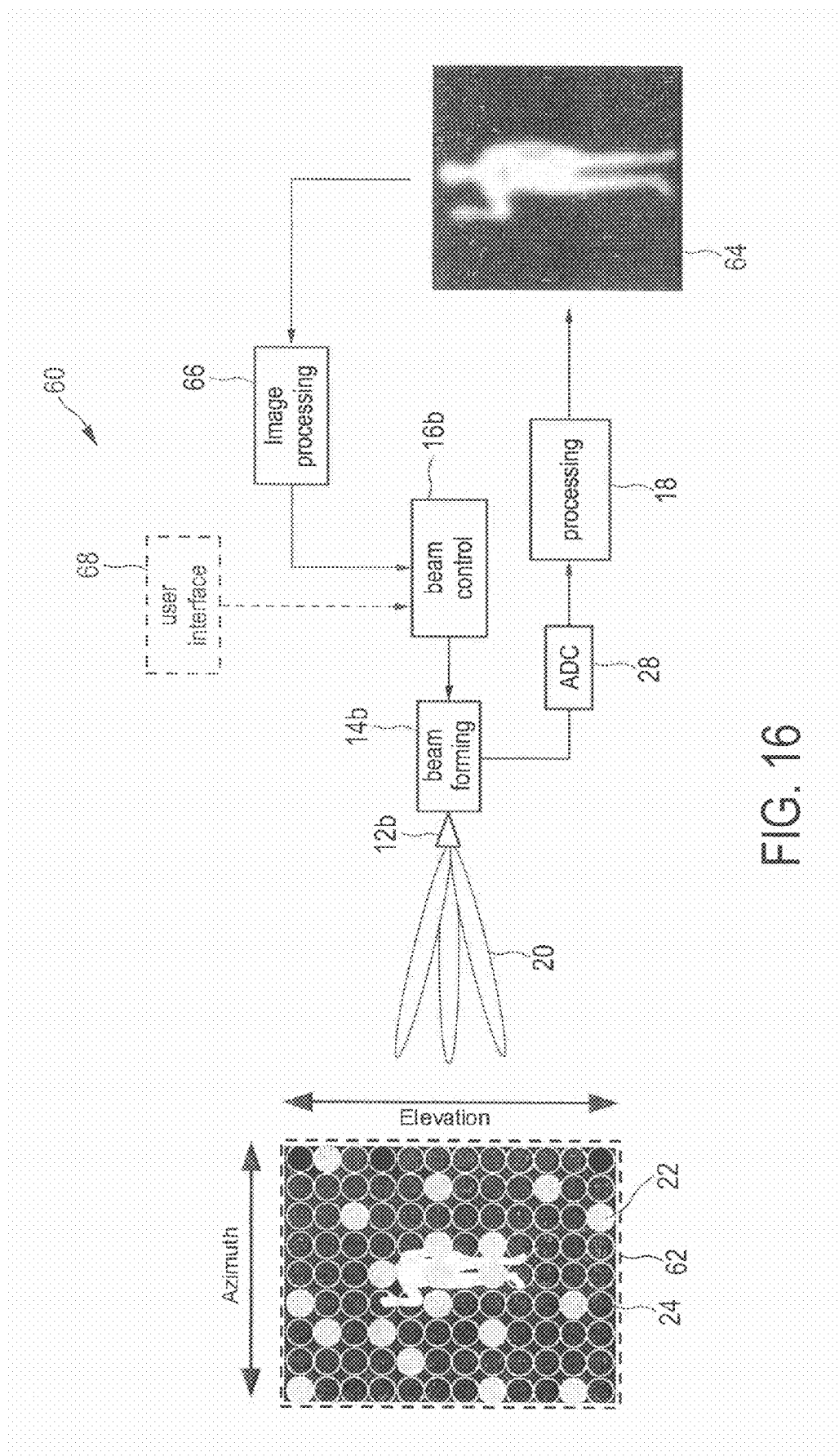
FIGS. 16 to 18 show a schematic block diagram illustrating an embodiment of an imaging device according to the present invention using a zoom-in approach.
Figure 17:
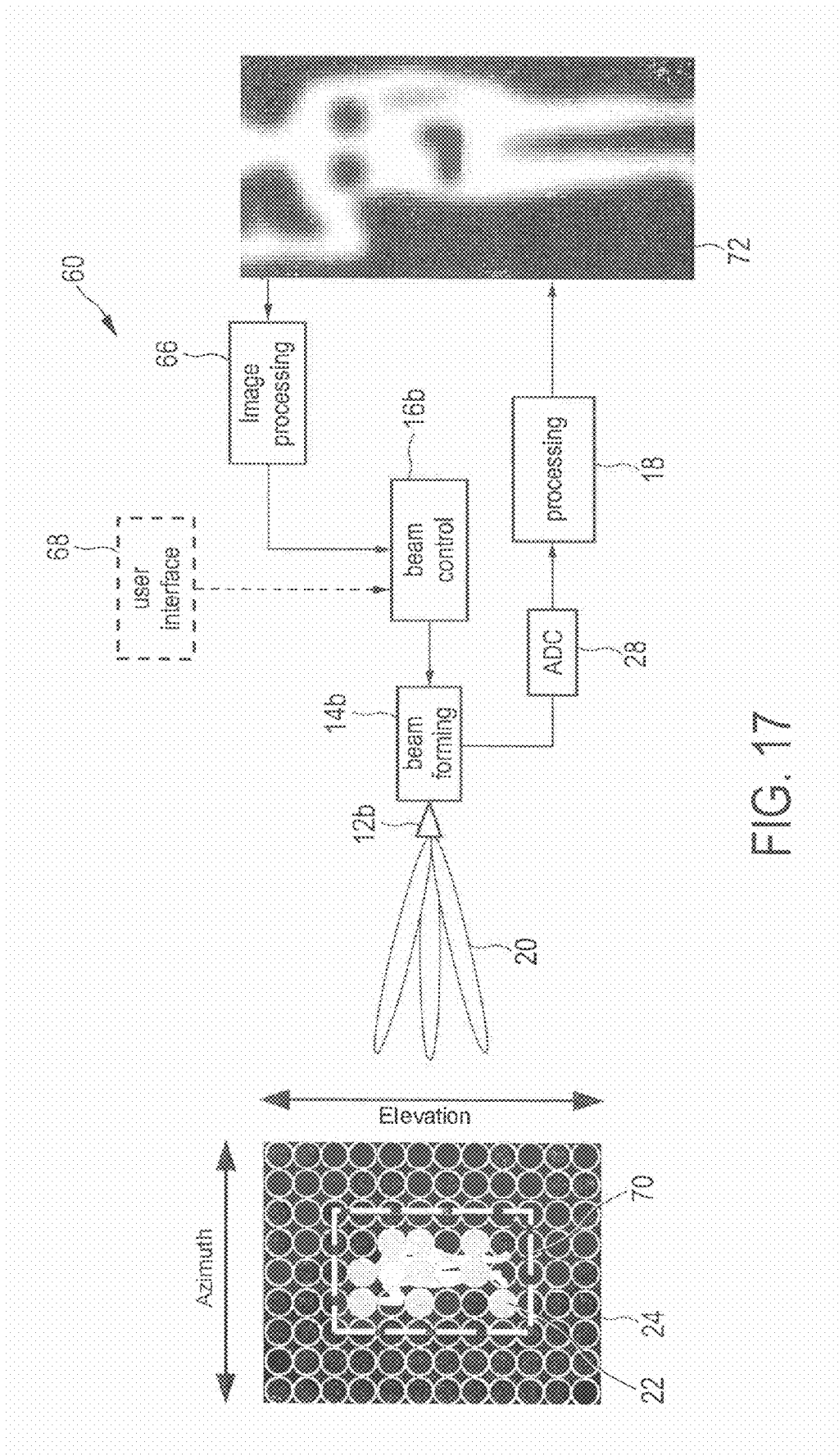
Figure 18:
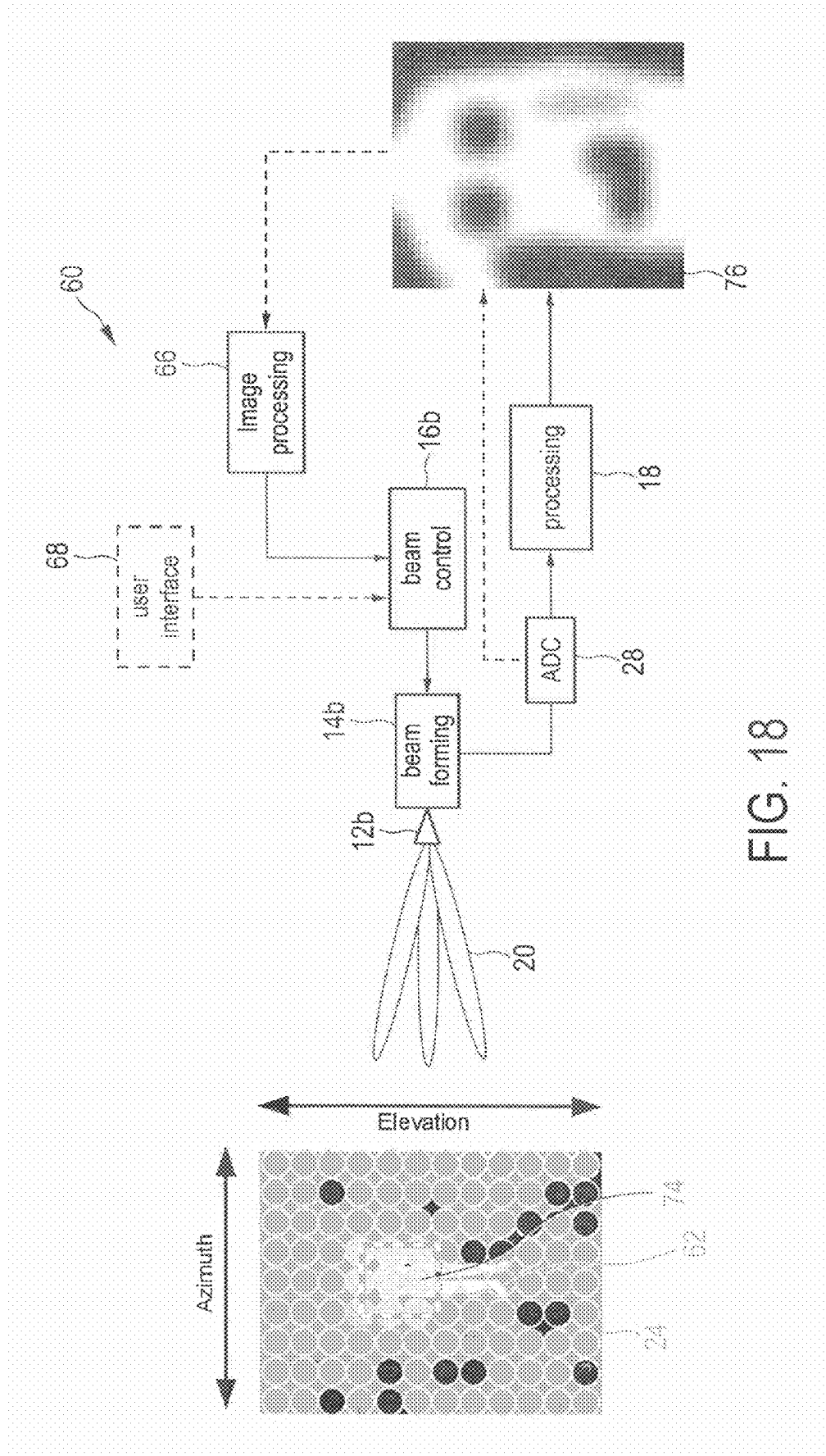

An embodiment 60 of a radiometric imaging device according to the present invention using this zoom-in approach is schematically shown in FIGS. 16 to 18. This embodiment 60 shows similarities to the embodiment 10b shown in FIG. 3 in as far as an electronic beam control is provided, i.e. the radiometer 12b (including the antenna) is not mechanically moved by a motor (or other mechanical movement means) for effecting a movement of the spot 22 over the scene 24, but electronic spot movement means 14b are provided for electronically moving/positioning the sensitivity profile of said radiometer 12b for effecting a movement of said spot 22. However, in another embodiment the radiometer may also be mechanically moved as in the embodiment 10a shown in FIG. 2.

While this embodiment 60 may be a passive radiometric imaging device, it is preferably implemented as an active radiometric imaging device using a monostatic active radar system, i.e. the antenna 12b is received for both emitting radiation onto the scene 24 and receiving radiation emitted/reflected from the scene 24. Alternatively (not shown), a separate radio transmission antenna could be provided for emitting radiation onto the scene. A preferred embodiment typically includes a reflect antenna array for transmitting, receiving and/or reflecting the millimeter wave radiation to/from the object. Such antenna arrays can be constructed using traditional analog phased arrays or binary reflector arrays.

As an example here, the scene 24 includes a person who is wearing three concealed metallic objects: two metallic square plates on the breast area and a gun at the stomach area. The field of view (FOV) 62 (marked as dashed line) of the scene 24 is determined by the beam control unit 16b, and the spatial resolution is determined by the beam width. The number of pixels in each direction is then obtained by dividing the FOV size in that direction by the beam width. For the following explanation it shall be assumed in this example that the scene 24 has N pixels for the depicted embodiment.

Figure 19:
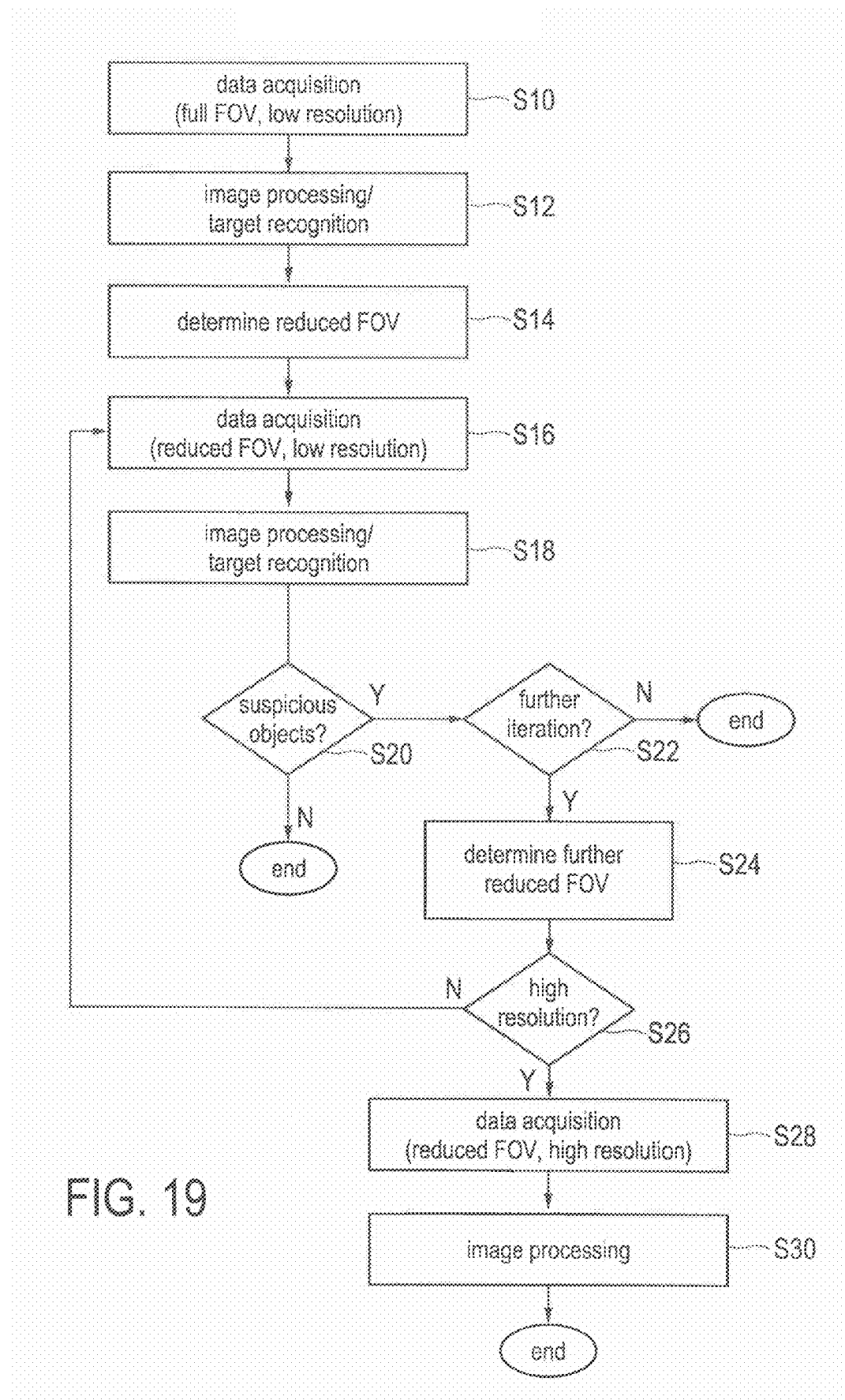
FIG. 19 shows a flow chart of a method used in the embodiment illustrated in FIGS. 16 to 18.

The scanning procedure performed by this embodiment 60 of the present invention comprises the following steps (see also the flow chart shown in FIG. 19).

In the first step S10, a small number of pixels K out of the N available (K<<N, e.g. 10% of the pixels) is (e.g. randomly or quasi-randomly) selected using a (known) distribution like Bernoulli, Gaussian, independent and identically distributed samples etc. Generally, as explained above, a low number of pixels 22 distributed over the scene 24 is selected. The beam control unit 16b, which may also be implemented as a pixel selection unit, points the beam steering antenna 12b to the selected pixel positions (spots) 22 in the scene 24 sequentially for doing the acquisition of data by detection of radiation from said selected spots.

The acquired samples (representing a low-density signal pattern) are preferably used (step S12) to reconstruct an image 64 using compressive sensing as explained above. Fourier or wavelets transformations can be used as sparse domain for the image, but more suited transformations may end up with better reconstruction results. The image 64 reconstructed will have low quality but will be enough to extract, e.g. through some simple image processing algorithm in an image processing unit 66, information about the limits of the target (object of interest), i.e. of the person here, within the scene 24. Alternatively or in addition, a user interface 68 may be provided to input information about the limits of the target, e.g. based on an optical inspection of the image 64 by a user. Hence, the image post-processing can be substituted by the human operator, who may directly decide, e.g. using a pointer device (mouse), which area of the scene shall be scanned in the next step.

The information about the limits of the target determined in the step S12 is used in the subsequent step S14 to establish a new FOV 70 of reduced size for the antenna scanning system. The new reduced FOV 70 will include only the target(s) of interest in the scene 24. This is illustrated for this example in FIG. 17, where the new FOV 70 is also indicated.

The new FOV 70 is now preferably scanned (step S16) following the same principle as explained above, i.e. a few (low number of) pixels 22 are selected within the new FOV 70, from which radiation is acquired. From these radiation signal the corresponding part of the image is reconstructed (step S18) using the compressing sensing technique. Again some image processing algorithm processes the reconstructed image 72 trying to detect concealed/suspicious objects. If some area or areas of the reconstructed image 72 contain suspicious objects that need to be inspected more in detail, as checked in step S20, and if a further iteration of data acquisition and image processing shall be performed (e.g. if an upper limit of the number of iterations (e.g. 5 or 10 iterations) has not yet been reached), as checked in step S22, a new, further reduced FOV 74 (see FIG. 18) surrounding these suspicious objects is defined (step S24) to be scanned in another data acquisition step.

It may now be decided (step S26) if the next data acquisition step shall again be performed as before, i.e. at a low number of pixels and using compressive sensing, or if now a full scan (at a high number of pixels, i.e. generally all pixels) shall be performed, e.g. if the further reduced FOV 74 is small enough and/or essentially covers only the desired suspicious objects. Hence, if again a low number of pixels shall be used for data acquisition the method continues with step S16, while in the other case a data acquisition is performed (step S28) at a high number of pixels and an image processing is performed (step S30) in which the usage of compressive sensing is avoided and normal image reconstruction techniques are applied. Finally, a high resolution image 76 of the further reduced FOV 74 is obtained as shown in FIG. 18.

The embodiment of the method according to the present invention as explained with reference to FIGS. 16 to 19 using a zooming-in approach can also be implemented, for example, in only one or two steps if suspected objects are already identified in the first or second reconstructed image 64, 72. In other situations more than three scans may be necessary.

The advantage of this embodiment of the method, in comparison with standard methods, is the reduced inspection time. In particular, the human operator has a first overview of the scene almost immediately and can concentrate directly onto the suspicious areas. In general, the inspection time per object of interest, e.g. per person, will be reduced.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A radiometric imaging device for scanning a scene and generating a high-density signal pattern representing said scene, said device comprising:
    a radiometer to detect radiation emitted in a predetermined spectral range from a spot of said scene and for generating a radiation signal from said detected radiation,
    a spot mover to effect a movement of the spot, from which the radiation is detected, to various positions,
    control circuitry to control said spot mover to effect the movement of the spot from one position to another position so that radiation is detected at a number of spots distributed over the scene, wherein said number is lower than a number of pattern signals of said high-density signal pattern and radiation signals generated from the radiation detected at said number of spots form a low-density signal pattern, and
    processing circuitry to process the radiation signals of said low-density signal pattern and to generate said high-density signal pattern by applying compressive sensing to said low-density signal pattern, wherein
    said control circuitry is adapted to effect, after said high-density signal pattern representing said scene has been generated, a movement of the spot, from which the radiation is detected, to various positions in a reduced field of view, which is smaller than the whole scene and contains an object of interest, so that radiation is detected at a reduced number of spots distributed over the reduced field of view,
    said reduced number is lower than a number of pattern signals of a high-density signal pattern representing said reduced field of view and radiation signals generated from the radiation detected at said reduced number of spots form a low-density signal pattern of said reduced field of view, and said processing circuitry is adapted to process the radiation signals of said low-density signal pattern of said reduced field of view and to generate said high-density signal pattern of said reduced field of view by applying compressive sensing to said low-density signal pattern of said reduced field of view.

2. The radiometric imaging device as claimed in claim 1, wherein said control circuitry is adapted to control said spot mover so that the number of radiation signals of said low-density signal pattern is by a factor in the range from 10% to 90% lower than the number of pattern signals of said high-density pattern.

3. The radiometric imaging device as claimed in claim 1, wherein said control circuitry is adapted to control said spot mover so that the spots, from which radiation is detected, are substantially equally distributed over the scene.

4. The radiometric imaging device as claimed in claim 1, wherein said control circuitry is adapted to control said spot mover to effect a continuous movement of said spot over the scene.

5. The radiometric imaging device as claimed in claim 1, wherein said control circuitry is adapted to control said spot mover to effect a movement along a pre-determined trajectory over the scene, along a zig-zag trajectory, a meandering trajectory that includes scans over the scene line by line or column by column, or a spiral trajectory.

6. The radiometric imaging device as claimed in claim 1, wherein said control circuitry is adapted to control said spot mover in dependence on a desired resolution of an image of the scene, a distribution of an object to be scanned within the scene, and/or a sparsity of an image of said scene.

7. The radiometric imaging device as claimed claim 1, wherein said control circuitry is adapted to randomly determine the direction of movement of the spot from one position to the next position.

8. The radiometric imaging device as claimed in claim 1, wherein said spot mover includes a mechanical spot movement device to effect a relative movement of the radiometer with respect to the scene for effecting a movement of said spot to mechanically move the radiometer for effecting a movement of said spot.

9. The radiometric imaging device as claimed in claim 1, wherein said spot mover comprises electronic spot movement circuitry to electronically move the sensitivity profile of said radiometer for effecting a movement of said spot by an electronic beam positioner or an electronic beam former.

10. The radiometric imaging device as claimed in claim 1, wherein said processing circuitry is adapted to reconstruct an image by applying a l1-norm minimization algorithm to said radiation signals.

11. The radiometric imaging device as claimed in claim 1, wherein the radiation signals of said scene have a sparse representation in a known domain, a total variation domain, Fourier domain, wavelets domain, or curvelets domain.

12. The radiometric imaging device as claimed in claim 1, further comprising a memory to store one or more lists of positions of spots, from which radiation shall be detected, wherein said control circuitry is adapted for selecting the positions of said plurality of distributed spots from one of said lists.

13. The radiometric imaging device as claimed in claim 1, further comprising position generation circuitry to determine the positions of said plurality of distributed spots by use of a predetermined function or distribution by a uniform Bernoulli or Gaussian distribution.

14. The radiometric imaging device as claimed in claim 1, wherein said control circuitry is adapted to control said spot mover to effect a movement so that radiation is detected at a number of spots irregularly distributed over the scene.

15. The radiometric imaging device as claimed in claim 1, wherein said radiometer comprises a single radiometer unit to detect radiation emitted from a spot representing a single pixel.

16. The radiometric imaging device as claimed in claim 1, wherein said radiometer comprises a line or array of radiometer units to detect radiation emitted from a spot representing a line or array of pixels.

17. The radiometric imaging device as claimed in claim 1, wherein said radiometer is adapted to detect radiation emitted in a millimeter wavelength range, in a wavelength range from 0.1 to 100 mm or from 1 to 10 mm.

18. The radiometric imaging device as claimed in claim 1, wherein said control circuitry is adapted to divide said scene into blocks of a number of pixels, select at least one pixel from each block and connect said selected pixels forming a trajectory, along which the spot is moved over the scene.

19. The radiometric imaging device as claimed in claim 1, wherein said radiometric imaging device is an active radiometric imaging device further comprising a radio transmitter to emit radiation onto said scene, wherein said radiometer is adapted to detect radiation reflected from said scene.

20. The radiometric imaging device as claimed in claim 1, wherein said radiometric imaging device is a passive radiometric imaging device.

21. The radiometric imaging device as claimed in claim 1,
wherein said control circuitry is adapted to further stepwise reduce the field of view and to effect a movement of the spot, from which the radiation is detected, to various positions in a further reduced field of view, and wherein said processing circuitry is adapted to process the radiation signals of said low-density signal pattern of said further reduced field of view and to generate a high-density signal pattern of said further reduced field of view.

22. The radiometric imaging device as claimed in claim 1,
wherein said control circuitry is adapted to effect a movement of the spot, from which the radiation is detected, to various positions in a reduced field of view, which is smaller than the whole scene and contains an object of interest, so that radiation is detected at a high number of spots of the reduced field of view, wherein said high number corresponds to the number of pattern signals of a high-density signal pattern representing said reduced field of view and the radiation signals generated from the radiation detected at said high number of spots form a high-density signal pattern of said reduced field of view, and wherein said processing circuitry is adapted to process the radiation signals of said high-density signal pattern of said reduced field of view.

23. The radiometric imaging device as claimed in claim 1, further comprising:

detection circuitry to detect an object of interest in a high-density signal pattern and to provide object information about a detected object of interest, including a position and size of an object of interest, to said control circuitry.

24. The radiometric imaging device as claimed in claim 1, further comprising:

a user interface circuit to input and provide information about a detected object of interest, including a position and size of an object of interest, and/or field of view information about the position and size of a reduced field of view to said control circuitry.

25. A radiometric imaging method for scanning a scene and generating a high-density signal pattern representing said scene, said method comprising the steps of:
- detecting radiation emitted in a predetermined spectral range from a spot of said scene and for generating a radiation signal from said detected radiation,
- moving of the spot, from which the radiation is detected, to various positions,
- controlling a spot movement device to effect the movement of the spot from one position to another position so that radiation is detected at a number of spots distributed over the scene, wherein said number is lower than the number of pattern signals of said high-density signal pattern and the radiation signals generated from the radiation detected at said number of spots form a low-density signal pattern,
- processing the radiation signals of said low-density signal pattern and for generating said high-density signal pattern by applying compressive sensing to said low-density signal pattern,
- controlling, after said high-density signal pattern representing said scene has been generated, a movement of the spot, from which the radiation is detected, to various positions in a reduced field of view, which is smaller than the whole scene and contains an object of interest, so that radiation is detected at a reduced number of spots distributed over the reduced field of view, wherein said reduced number is lower than a number of pattern signals of a high-density signal pattern representing said reduced field of view and radiation signals generated from the radiation detected at said reduced number of spots form a low-density signal pattern of said reduced field of view, and
- processing the radiation signals of said low-density signal pattern of said reduced field of view and generating said high-density signal pattern of said reduced field of view by applying compressive sensing to said low-density signal pattern of said reduced field of view.

26. Computer readable non-transitory medium having instructions stored thereon which, when carried out on a computer, cause the computer to perform the steps of processing and reconstructing of the method as claimed in claim 25.

27. A radiometric imaging device that scans a scene and generates a high-density signal pattern representing said scene, said device comprising:
- a radiometer that detects radiation emitted in a predetermined spectral range from a spot of said scene and generates a radiation signal from said detected radiation,
- spot moving means for effecting a movement of the spot, from which the radiation is detected, to various positions,
- control means for controlling said spot moving means to effect the movement of the spot from one position to another position so that radiation is detected at a number of spots distributed over the scene, wherein said number is lower than the number of pattern signals of said high-density signal pattern and the radiation signals generated from the radiation detected at said number of spots form a low-density signal pattern, and
- processing means for processing the radiation signals of said low-density signal pattern and generates said high-density signal pattern by applying compressive sensing to said low-density signal pattern, wherein
- said control means effects, after said high-density signal pattern representing said scene has been generated, a movement of the spot, from which the radiation is detected, to various positions in a reduced field of view, which is smaller than the whole scene and contains an object of interest, so that radiation is detected at a reduced number of spots distributed over the reduced field of view,
- said reduced number is lower than a number of pattern signals of a high-density signal pattern representing said reduced field of view and radiation signals generated from the radiation detected at said reduced number of spots form a low-density signal pattern of said reduced field of view, and
- said processing means processes the radiation signals of said low-density signal pattern of said reduced field of view and generates said high-density signal pattern of said reduced field of view by applying compressive sensing to said low-density signal pattern of said reduced field of view.

28. The radiometric imaging device as claimed in claim 1, wherein said control circuitry is adapted to control said spot mover so that the number of radiation signals of said low-density signal pattern is by a factor in the range from 25% to 75% lower than the number of pattern signals of said high-density pattern.

* * * * *